US012376637B2

(12) United States Patent
Karpiel et al.

(10) Patent No.: US 12,376,637 B2
(45) **Date of Patent: *Aug. 5, 2025**

(54) IMITATION FLOWER BOUQUET SYSTEM

(71) Applicant: LOVEPOP, INC., Boston, MA (US)

(72) Inventors: Jozef Karpiel, Boston, MA (US); Elana Walker, Boston, MA (US); Xinzhi Jiao, Boston, MA (US); Melissa Otis, Boston, MA (US); Robin Rose, Boston, MA (US)

(73) Assignee: LOVEPOP. INC., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/368,797

(22) Filed: Sep. 15, 2023

(65) Prior Publication Data

US 2024/0016248 A1 Jan. 18, 2024

Related U.S. Application Data

(63) Continuation of application No. 17/139,749, filed on Dec. 31, 2020, now Pat. No. 11,793,255, which is a (Continued)

(51) Int. Cl.

*A41G 1/00* (2006.01)
*G09F 1/06* (2006.01)
*G09F 1/08* (2006.01)

(52) U.S. Cl.

CPC ................ *A41G 1/00* (2013.01); *G09F 1/06* (2013.01); *G09F 1/065* (2013.01); *G09F 1/08* (2013.01)

(58) Field of Classification Search

CPC ........ A01G 9/026; A41G 1/00; B42D 15/042; B42D 15/045; G09F 1/04; G09F 1/06; G09F 1/065; G09F 1/08; G09F 2001/085
See application file for complete search history.

(56) References Cited

U.S. PATENT DOCUMENTS 930,108 A 8/1909 Walcutt
1,052,187 A * 2/1913 Stranders ................ G09F 1/06 40/539

(Continued)

FOREIGN PATENT DOCUMENTS

GB 2072010 A * 9/1981 .............. A41G 1/00
JP 2020090078 A 6/2020
RU 75920 U1 * 9/2008

OTHER PUBLICATIONS

International Search Report and Written Opinion of the International Searching Authority for International Application No. PCT/US2021/048858 dated Dec. 9, 2021 (7 pages).

(Continued)

*Primary Examiner* — Patrick D Hawn
(74) *Attorney, Agent, or Firm* — Polsinelli PC

(57) ABSTRACT

Implementations described and claimed herein provide an imitation flower bouquet system. In one implementation, an imitation flower arrangement has a decorative portion and a base portion, with the decorative portion including at least one imitation flower. An imitation vase includes a plurality of panels. The base portion of the imitation flower arrangement is mounted to the plurality of panels of the imitation vase at a set of one or more connections in a translational relationship. The translational relationship creates a free standing imitation flower bouquet that is moveable between a folded position and an unfolded position by translating movement between the imitation flower arrangement and the imitation vase.

17 Claims, 21 Drawing Sheets

Related U.S. Application Data continuation-in-part of application No. 29/749,210, filed on Sep. 3, 2020, now Pat. No. Des. 940,585.

(56) References Cited

U.S. PATENT DOCUMENTS

| | | | | |
|---|---|---|---|---|
| 1,194,678 | A | 8/1916 | Stranders | |
| 1,541,002 | A | 6/1925 | Shramek | |
| 1,854,225 | A | 4/1932 | Benjamin et al. | |
| 1,891,011 | A | 12/1932 | Purdy | |
| 1,892,714 | A | 1/1933 | Wellman | |
| 1,951,642 | A | 3/1934 | Charles et al. | |
| 1,987,461 | A | 1/1935 | Bocye | |
| 2,117,088 | A | 5/1938 | John et al. | |
| 2,125,424 | A | 8/1938 | Carey et al. | |
| 2,314,631 | A | 3/1943 | Don et al. | |
| 2,620,119 | A | 12/1952 | George | |
| 2,780,402 | A | 2/1957 | Zucker et al. | |
| 3,253,767 | A | 5/1966 | Pellaton | |
| 3,443,741 | A | 5/1969 | Stockdale et al. | |
| 3,569,785 | A | 3/1971 | Durbeck et al. | |
| 3,768,720 | A | 10/1973 | Bundy | |
| 3,867,788 | A | 2/1975 | Mickelson | |
| 3,937,392 | A | 2/1976 | Swisher | |
| 4,042,164 | A | 8/1977 | Croley | |
| 4,166,567 | A | 9/1979 | Beach, Jr. et al. | |
| 4,166,568 | A | 9/1979 | Swan | |
| 4,199,098 | A | 4/1980 | Lopez | |
| 4,359,182 | A | 11/1982 | Perkins, Jr. | |
| 4,398,650 | A | 8/1983 | Holmes et al. | |
| D273,365 | S | 4/1984 | Lukins et al. | |
| D300,706 | S | 4/1989 | Durand | |
| 4,850,506 | A | 7/1989 | Heaps, Jr. et al. | |
| 4,856,706 | A | 8/1989 | Van Der Straten | |
| 4,919,306 | A | 4/1990 | Heaps, Jr. et al. | |
| 4,950,216 | A | 8/1990 | Weder | |
| 5,029,412 | A | 7/1991 | Weder et al. | |
| D326,830 | S | 6/1992 | Vaughn | |
| D327,234 | S | 6/1992 | Vaughn | |
| D328,168 | S | 7/1992 | Bartle | |
| D328,706 | S | 8/1992 | Ruff | |
| D332,808 | S | 1/1993 | Neuroth et al. | |
| D336,526 | S | 6/1993 | Marienberg | |
| D352,308 | S | 11/1994 | Reh | |
| D360,386 | S | 7/1995 | Weder et al. | |
| D361,295 | S | 8/1995 | Weder et al. | |
| D361,297 | S | 8/1995 | Weder et al. | |
| 5,445,315 | A | 8/1995 | Shelby | |
| D368,276 | S | 3/1996 | Buzby | |
| 5,518,168 | A | 5/1996 | Mayer | |
| 5,595,008 | A * | 1/1997 | Johnson | B42D 15/045 283/117 |
| D379,780 | S | 6/1997 | Weder et al. | |
| D380,981 | S | 7/1997 | Weder et al. | |
| D385,186 | S | 10/1997 | Fildan | |
| D388,018 | S | 12/1997 | Weder et al. | |
| D391,894 | S | 3/1998 | Weder et al. | |
| D393,816 | S | 4/1998 | Conner | |
| 5,771,614 | A | 6/1998 | Dawson | |
| 5,775,571 | A | 7/1998 | Edelman | |
| D411,079 | S | 6/1999 | Graham | |
| 5,937,553 | A | 8/1999 | Maran | |
| D419,914 | S | 2/2000 | Weder et al. | |
| 6,026,983 | A | 2/2000 | Graham | |
| 6,199,912 | B1 * | 3/2001 | Finkelshteyn | B42D 15/045 428/17 |
| D442,084 | S | 5/2001 | Hoffman et al. | |
| 6,237,838 | B1 | 5/2001 | Bradenbaugh | |
| 6,412,686 | B1 | 7/2002 | Mahl et al. | |
| 6,415,927 | B1 | 7/2002 | Stone et al. | |
| 6,431,435 | B1 | 8/2002 | Jones et al. | |
| D472,466 | S | 4/2003 | Weinstein et al. | |
| D472,467 | S | 4/2003 | Weinstein et al. | |
| 6,574,919 | B2 * | 6/2003 | Weder | B65B 25/026 47/72 |
| D480,660 | S | 10/2003 | Faulkner | |
| 6,672,002 | B1 | 1/2004 | Gumpper | |
| 6,827,217 | B2 | 12/2004 | Matsuguchi et al. | |
| 6,932,266 | B2 | 8/2005 | Jones et al. | |
| 7,328,833 | B1 | 2/2008 | Wiley | |
| 7,434,721 | B2 | 10/2008 | Feltz | |
| 7,490,425 | B2 | 2/2009 | Crowell et al. | |
| D640,133 | S | 6/2011 | Jones et al. | |
| D642,648 | S | 8/2011 | Oliver | |
| D644,099 | S | 8/2011 | Martinez Rodriguez | |
| D644,508 | S | 9/2011 | Martinez Rodriguez | |
| D645,951 | S | 9/2011 | Dupre et al. | |
| 8,025,206 | B2 | 9/2011 | Wisecarver et al. | |
| 8,025,208 | B2 | 9/2011 | Wisecarver et al. | |
| 8,091,768 | B2 | 1/2012 | Wisecarver et al. | |
| D662,543 | S | 6/2012 | Dennis et al. | |
| D662,784 | S | 7/2012 | Fleck | |
| D741,662 | S | 10/2015 | Steel | |
| 9,475,333 | B2 | 10/2016 | Yeh | |
| 9,524,658 | B1 | 12/2016 | Wise et al. | |
| 9,601,033 | B2 | 3/2017 | Wise et al. | |
| 9,842,516 | B2 | 12/2017 | Yeh | |
| 9,873,280 | B1 | 1/2018 | Nelson et al. | |
| D815,201 | S | 4/2018 | Larson et al. | |
| 10,065,782 | B1 | 9/2018 | Jones et al. | |
| 10,081,471 | B2 | 9/2018 | Barkerding et al. | |
| D832,917 | S | 11/2018 | Jiao | |
| D840,559 | S | 2/2019 | Hollingsworth et al. | |
| D846,197 | S | 4/2019 | Apodaca | |
| D849,530 | S | 5/2019 | Fremgen et al. | |
| D852,882 | S | 7/2019 | Rose | |
| D853,482 | S | 7/2019 | Jiao | |
| D854,081 | S | 7/2019 | Jiao | |
| D854,082 | S | 7/2019 | Jiao | |
| D854,614 | S | 7/2019 | Jiao | |
| 10,339,838 | B2 | 7/2019 | Wise et al. | |
| D856,608 | S | 8/2019 | Funari et al. | |
| 10,388,189 | B2 | 8/2019 | Rose et al. | |
| D867,448 | S | 11/2019 | Yue | |
| D867,449 | S | 11/2019 | Yue | |
| 10,500,887 | B1 | 12/2019 | Kelly | |
| 10,500,888 | B2 | 12/2019 | Upton | |
| 10,713,975 | B2 | 7/2020 | Wallen | |
| D893,997 | S | 8/2020 | Ryan et al. | |
| 10,752,397 | B2 | 8/2020 | Jones et al. | |
| D898,296 | S | 10/2020 | Min | |
| D900,601 | S | 11/2020 | Chen | |
| D902,776 | S | 11/2020 | Bansal et al. | |
| 10,899,495 | B2 | 1/2021 | Kim et al. | |
| 11,084,313 | B2 | 8/2021 | Nejad et al. | |
| 11,127,316 | B2 | 9/2021 | Nejad et al. | |
| D940,585 | S | 1/2022 | Karpiel et al. | |
| 11,238,758 | B2 | 2/2022 | Wallen | |
| 2004/0175519 | A1 * | 9/2004 | Weder | A01G 9/026 428/34.9 |
| 2005/0178060 | A1 * | 8/2005 | Weder | A47G 7/085 47/72 |
| 2005/0196080 | A1 | 9/2005 | Stone et al. | |
| 2006/0005438 | A1 | 1/2006 | Chang et al. | |
| 2007/0017133 | A1 | 1/2007 | Crowell et al. | |
| 2009/0173002 | A1 | 7/2009 | Plihal | |
| 2017/0273253 | A1 | 9/2017 | Yeh | |
| 2018/0102070 | A1 | 4/2018 | Yeh | |
| 2018/0344056 | A1 * | 12/2018 | Ferrer-Walsh | G09F 7/16 |
| 2020/0070562 | A1 | 3/2020 | Nejad et al. | |
| 2020/0074887 | A1 | 3/2020 | Nejad et al. | |
| 2020/0126450 | A1 | 4/2020 | Wise et al. | |
| 2021/0158725 | A1 | 5/2021 | Adair et al. | |
| 2022/0122487 | A1 | 4/2022 | Bucco | |
| 2022/0157199 | A1 | 5/2022 | Hewitt | |

OTHER PUBLICATIONS

Lovepop Purple Rose Bouquet—3D Flowers, Pop Up Bouquet, 6,243 ratings, Manufacturer Part No. CP2471, ASIN: B085FWJ5KH. online on Amazon.com, Date First Available: Mar. 3, 2020.

* cited by examiner

IMITATION FLOWER BOUQUET SYSTEM

CROSS-REFERENCE TO RELATED APPLICATIONS

The present application is a continuation of U.S. patent application Ser. No. 17/139,749, entitled "Imitation Flower Bouquet System" and filed Dec. 31, 2020, which is a continuation-in-part of U.S. Design patent application No. 29/749,210, entitled "Popup Bouquet Vase" and filed on Sep. 3, 2020. Each of these applications is incorporated by reference in its entirety herein.

FIELD

Aspects of the present disclosure relate generally to popup structures and more particularly to an imitation flower bouquet that moves between a folded position and an unfolded position.

BACKGROUND

Many people give or obtain flower bouquets to mark various occasions and to provide décor. However, live flowers have a relatively short timeframe during which they can be enjoyed. Imitation flowers may replace live flowers for indefinite enjoyment, but conventional imitation flowers are often bulky and difficult to transport between locations. It is with these observations in mind, among others, that various aspects of the present disclosure were conceived and developed.

SUMMARY

Implementations described and claimed herein address the foregoing problems by providing an imitation flower bouquet system. In one implementation, an imitation flower arrangement has a decorative portion and a base portion, with the decorative portion including at least one imitation flower. An imitation vase includes a plurality of panels. The base portion of the imitation flower arrangement is mounted to the plurality of panels of the imitation vase at a set of one or more connections in a translational relationship. The translational relationship creates a free standing imitation flower bouquet that is moveable between a folded position and an unfolded position by translating movement between the imitation flower arrangement and the imitation vase.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to an imitation flower bouquet system. In one aspect, the imitation flower bouquet system includes an imitation flower bouquet and an envelope. The imitation flower bouquet may be a free standing imitation flower bouquet that moves between a folded position and an unfolded position. In the folded position, the free standing imitation flower bouquet is flat and configured to be received within the envelope. Within the envelope or similar packaging, the imitation flower bouquet system is easily transportable between locations, for example, as mail. In the unfolded position, the free standing imitation flower bouquet is positionable on a display surface, such as a table, a shelf, a display system, pedestal, and/or the like, such that the free standing imitation flower bouquet stands freely as a three-dimensional flower bouquet without any holding system, lock, or mount. Stated differently, the free standing imitation flower bouquet maintains its three-dimensional configuration in the unfolded position without any external assistance.

The imitation flower bouquet may include an imitation flower arrangement and an imitation vase. The imitation flower arrangement is mounted to the imitation vase in a translational relationship, such that movement of the imitation vase is translated to the imitation flower arrangement. More particularly, the imitation vase may receive an application of force, for example, from a user or due to gravity, moving the imitation vase. The translational relationship between the imitation vase and the imitation flower arrangement translates this movement of the imitation vase to the imitation flower arrangement. As illustrated in the Figures, the imitation flower bouquet system, including the imitation flower bouquet, the envelope, and/or the like may further include various ornamental features.

The technology disclosed herein generally provides for free standing popup structure systems and methods related thereto. The example implementations discussed and illustrated herein reference an imitation flower bouquet system. However, it will be appreciated by those skilled in the art that the presently disclosed technology is applicable to other types of free standing popup structures, including, but not limited to, ornaments, figurines, statues, and/or the like. Additionally, various aspects of the present technology may be incorporated into integrated systems, such that the popup structure is not free standing. For example, aspects of the imitation flower bouquet system may be incorporated into or otherwise mounted to a popup card. It will be appreciated that various configurations are contemplated.

Figure 1:
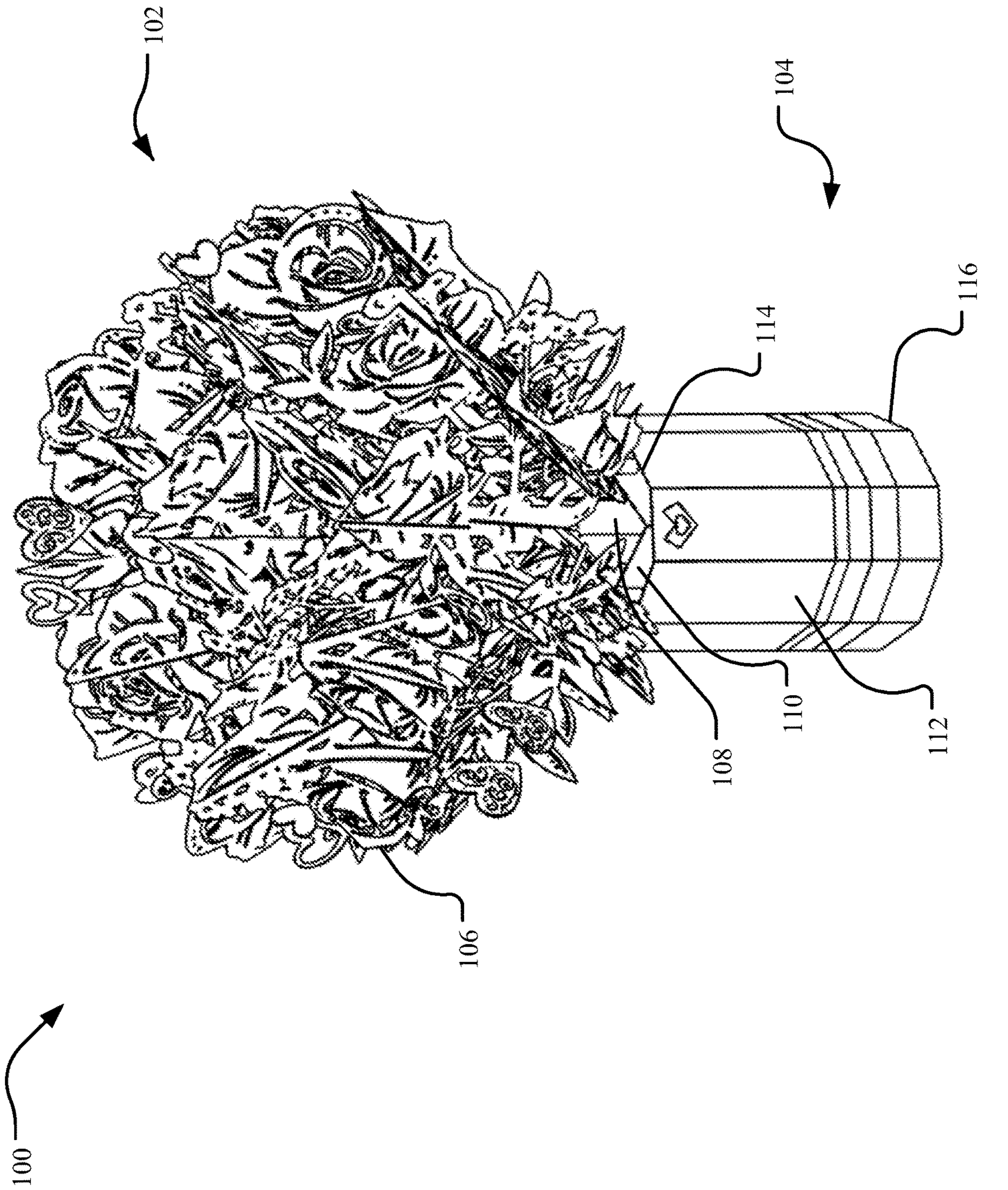
FIG. 1 shows a top perspective view of an example imitation flower bouquet.
Figure 2:
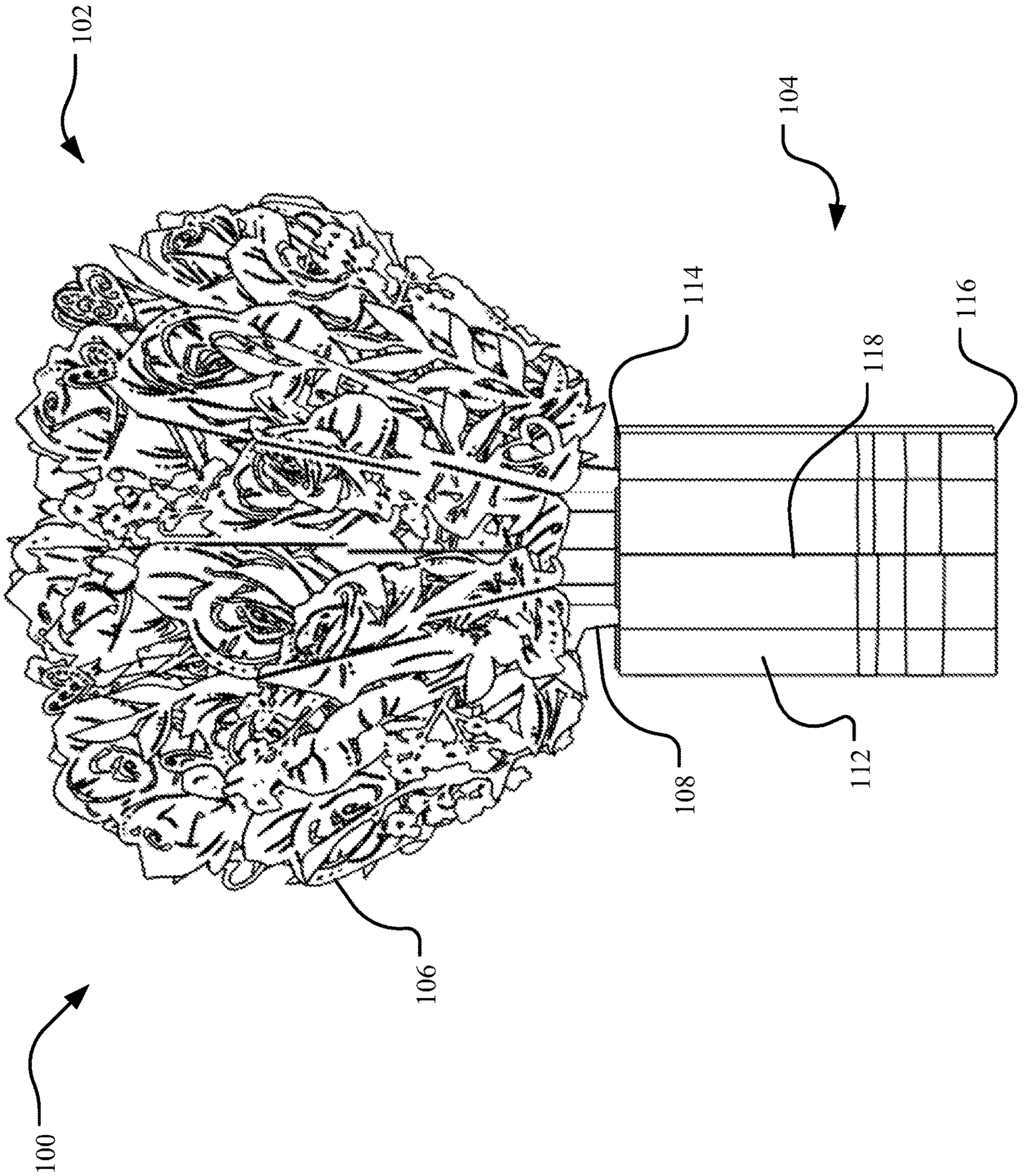
FIG. 2 shows a side view of the imitation flower bouquet.

To begin a detailed description of an example imitation flower bouquet system, reference is made to FIGS. 1-2. In one implementation, the imitation flower bouquet system includes an imitation flower bouquet 100 having an imitation flower arrangement 102 and an imitation vase 104. The imitation flower bouquet 100 may be made from one or more sheets and/or panels of paper. The imitation flower arrangement 102 includes a decorative portion 106 having various decorative features, such as imitation flowers, imitation leaves, imitation trees, imitation plants, characters, animals, insects, objects, and/or the like.

In one implementation, the imitation flower arrangement 102 includes a base portion including an inner base 108 and an outer base 110. Various portions of the base portion may be mounted to, integral with, or separate from each other, the decorative portion 106, and/or the imitation vase 104. The imitation flower arrangement 102 is disposed in a translational relationship with the imitation vase 104, such that movement of the imitation vase 104 translates to the imitation flower arrangement 102. In one implementation, the imitation vase 104 includes a plurality of panels 112 extending between a proximal edge 114 and a distal edge 116. The plurality of panels 112 may be formed by a plurality of planar surfaces, angled surfaces, curved surfaces, and/or the like. The base portion of the imitation flower arrangement 102 may be mounted to the plurality of panels 112 in the translational relationship. For example, the outer base 110 may be mounted to the plurality of panels 112 at a set of one or more connections, forming the translational relationship.

The translational relationship may form the imitation flower bouquet 100 as a free standing imitation flower bouquet that is moveable between a folded position and an unfolded position. As a free standing imitation flower bouquet, the imitation flower bouquet 100 stands freely as a three-dimensional flower bouquet with the distal edge 116 positioned on a display surface without any holding system, lock, or mount, as shown in FIGS. 1-2. Stated differently, the imitation flower bouquet 100 self-maintains a three-dimensional configuration in the unfolded position without any external assistance. In the folded position, the imitation flower bouquet 100 is flat. For example, in the folded position, the various portions of the imitation flower bouquet 100 are layered on top of each other in a parallel arrangement. In one implementation, the imitation vase 104 includes one or more fold lines 118 along which the imitation vase 104 folds into the folded position.

Figure 3:
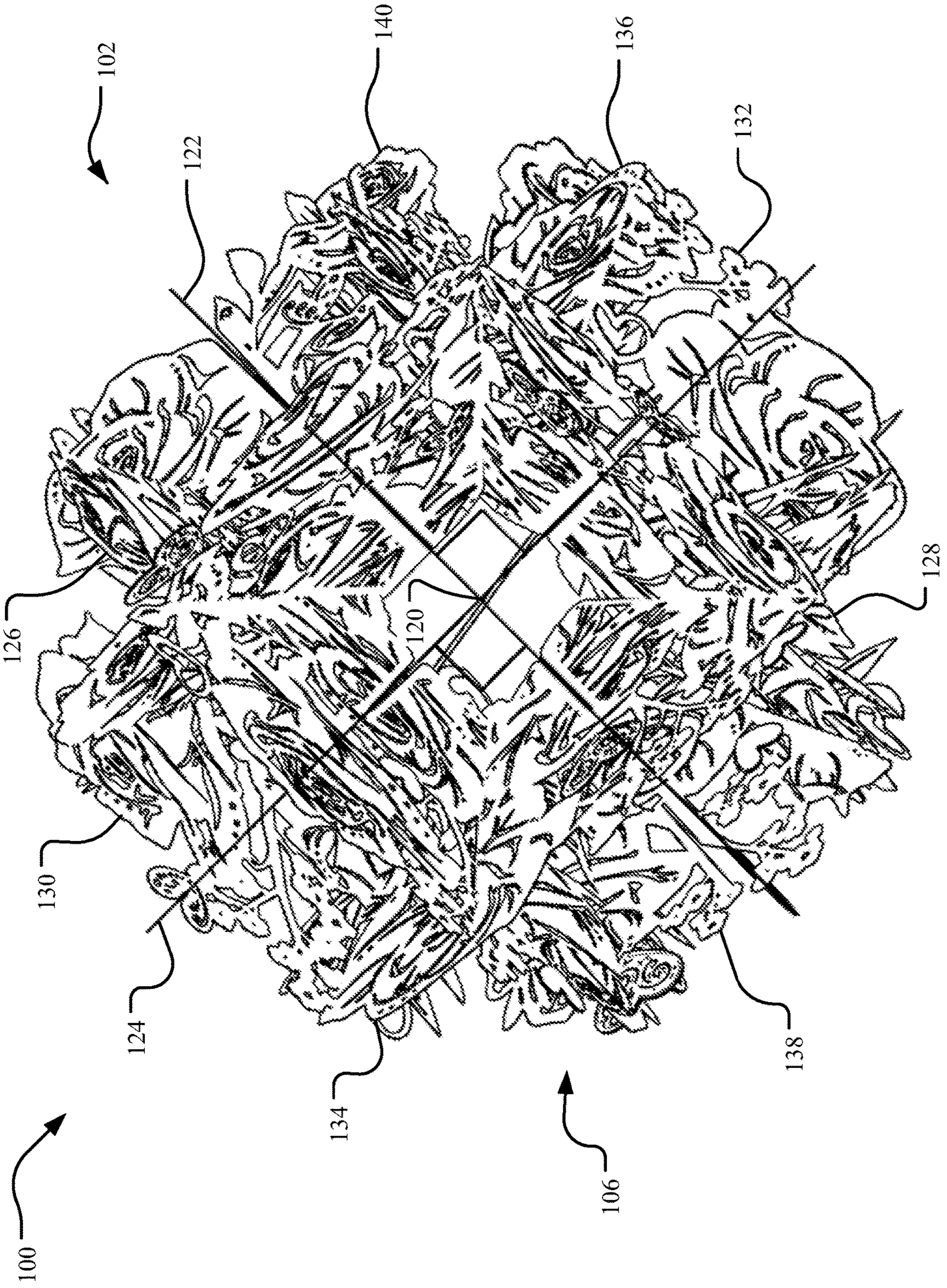
FIG. 3 illustrates a top view of the imitation flower bouquet.
Figure 4:
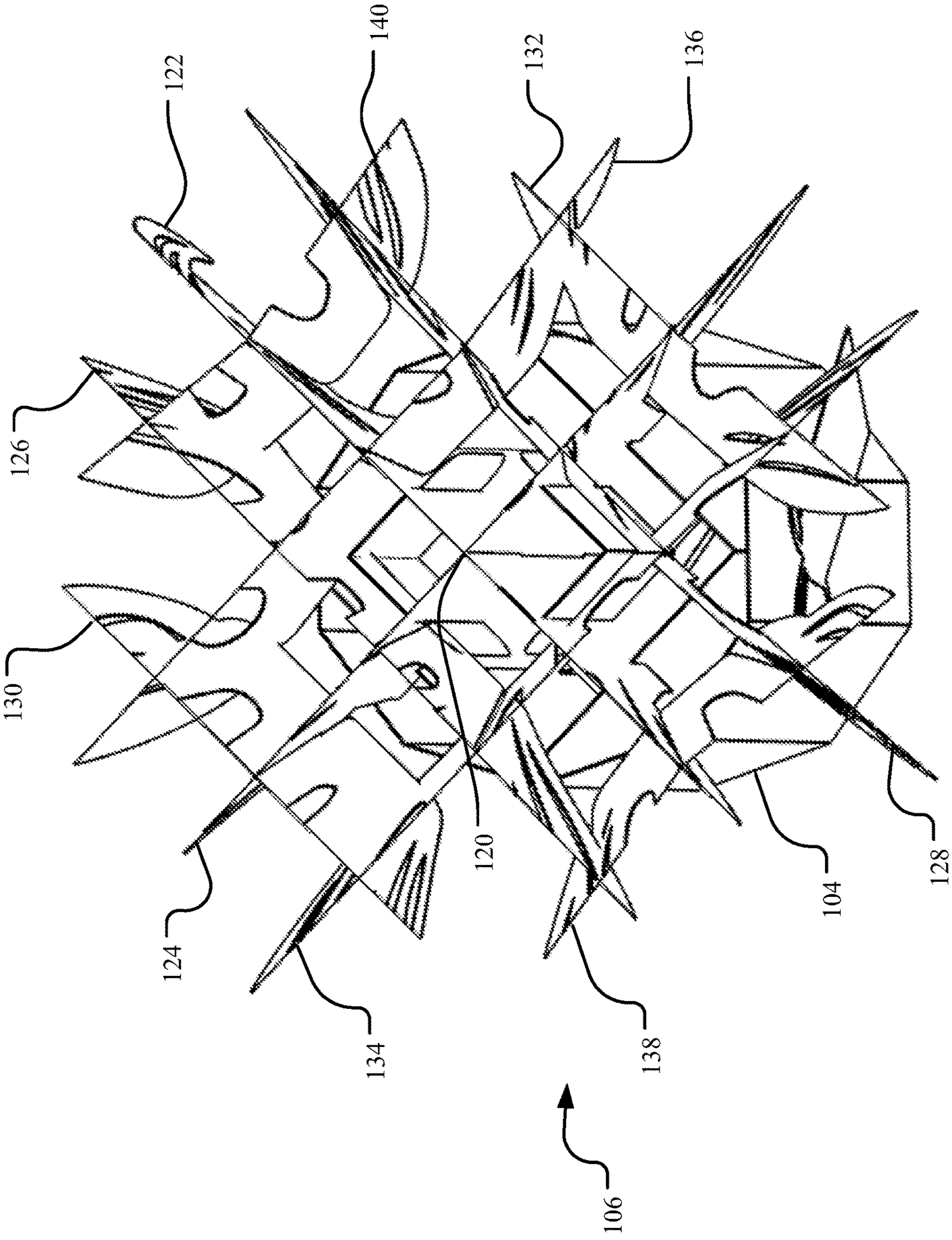
FIG. 4 depicts a top perspective cross-sectional view of the imitation flower bouquet, with the cross-section taken across an example imitation flower arrangement of the imitation flower bouquet.

Referring to FIGS. 3-4, in one implementation, the decorative portion 106 includes a plurality of decorative panels. The plurality of decorative panels form the various decorative features. More particularly, in the unfolded position, a three-dimensional shape of each of the decorative features, such as an imitation flower, is formed through an intersection between at least one first decorative panel and at least one second decorative panel. The at least one first decorative panel is oriented in a traverse relationship with respect to the at least one second decorative panel when the imitation flower bouquet 100 is in the unfolded position, and the at least one first decorative panel is oriented in a longitudinal relationship with respect to the at least one second decorative panel when the imitation flower bouquet 100 is in the folded position.

In one implementation, the at least one decorative panel includes a plurality of first decorative panels and the at least one decorative panel includes a plurality of second decorative panels. The plurality of first decorative panels extend in a same direction as each other when the imitation flower bouquet 100 is in both the folded position and in the unfolded position. Similarly, the plurality of second decorative panels extend in a same direction as each other when the imitation flower bouquet 100 in both the folded position and in the unfolded position. In the folded position, the plurality of first decorative panels and the plurality of second decorative panels extend in the same direction as each other, but in the unfolded position, the plurality of first decorative panels extend in a different direction from the plurality of second decorative panels. For example, the different direction may be a transverse direction.

The plurality of first decorative panels may include a first central decorative panel 122, and the plurality of second decorative panels may include a second central decorative panel 124 that intersect each other along an axis 120. The axis 120 may be disposed at a center of the imitation flower bouquet 100 and extend along a height of the imitation flower bouquet 100 from a proximal end to a distal end. A set of first middle decorative panels 126 and 128 and a set of first outer decorative panels 130 and 132 extend along the first central decorative panel 122 as part of the plurality of first decorative panels. When the imitation flower bouquet 100 is in the folded position, the first decorative panels 122 and 126-132 extend longitudinally in a same direction. When the imitation flower bouquet 100 is in the unfolded position, the first decorative panels 122 and 126-132 are spaced from each other extending in a first direction.

Similarly, a set of second middle decorative panels 134 and 136 and a set of second outer decorative panels 138 and 140 extend along the second central decorative panel 124 as part of the plurality of second decorative panels. When the imitation flower bouquet 100 is in the folded position, the second decorative panels 124 and 134-140 extend longitudinally in a same direction. When the imitation flower bouquet 100 is in the unfolded position, the second decorative panels 124 and 134-140 are spaced from each other extending in a second direction. The first direction is different than the second direction. The first direction may be angled, transverse, and/or perpendicular relative to the second direction.

Each of the first decorative panels 126-132 and the second decorative panels 134-140 forms a separate plane extending from a proximal end to a distal end. These planes may be disposed in an angled relationship when the imitation flower bouquet 100 is in the unfolded position. In one implementation, the angled relationship includes the planes of the first decorative panels 126-132 oriented at an angle relative to a plane of the first central decorative panel 122 and the planes of the second decorative panels 134-140 oriented at an angle relative to a plane of the second central decorative panel 124. The angled relationship includes the distal ends of the planes of the first decorative panels 126-132 disclosed at a first distance from the first central decorative panel 122 and the proximal ends of the planes of the first decorative panels 126-132 disclosed at a second distance from the first central decorative panel 122. In one implementation, the first distance is smaller than the second distance. The angled relationship similarly includes the distal ends of the planes of the second decorative panels 134-140 disclosed at a third distance from the second central decorative panel 124 and the proximal ends of the planes of the second decorative panels 134-140 disclosed at a fourth distance from the second central decorative panel 124. In one implementation, the third distance is smaller than the fourth distance.

In the unfolded position, the first decorative panels 122 and 126-132 and the second decorative panels 124 and 134-140 may be in a tapered configuration. In the tapered configuration, the first decorative panels 122 and 126-132 taper in height moving radially outwardly from the axis 120. For example, the set of first middle decorative panels 126 and 128 may be positioned between the first central decorative panel 122 and the set of first outer decorative panels 130 and 132, respectively, with the first central decorative panel 122 extending proximally beyond the set of first middle decorative panels 126 and 128, which in turn extend proximally beyond the set of first outer panels 130 and 132. Similarly, in the tapered configuration, the second decorative panels 124 and 134-140 taper in height moving radially outwardly from the axis 120. For example, the set of second middle decorative panels 134 and 136 may be positioned between the second central decorative panel 124 and the set of second outer decorative panels 138 and 140, respectively, with the second central decorative panel 124 extending proximally beyond the set of second middle decorative panels 134 and 136, which in turn extend proximally beyond the set of second outer panels 138 and 140. The tapered configuration and/or the angled relationship of the decorative panels 122-140 may form a three-dimensional shape of the decorative portion 106 in the unfolded position. It will be appreciated that other characteristics may contribute to or form the three-dimensional shape of the decorative portion 106 depending the type and configuration of the decorative features of the decorative portion 106.

Figure 5:
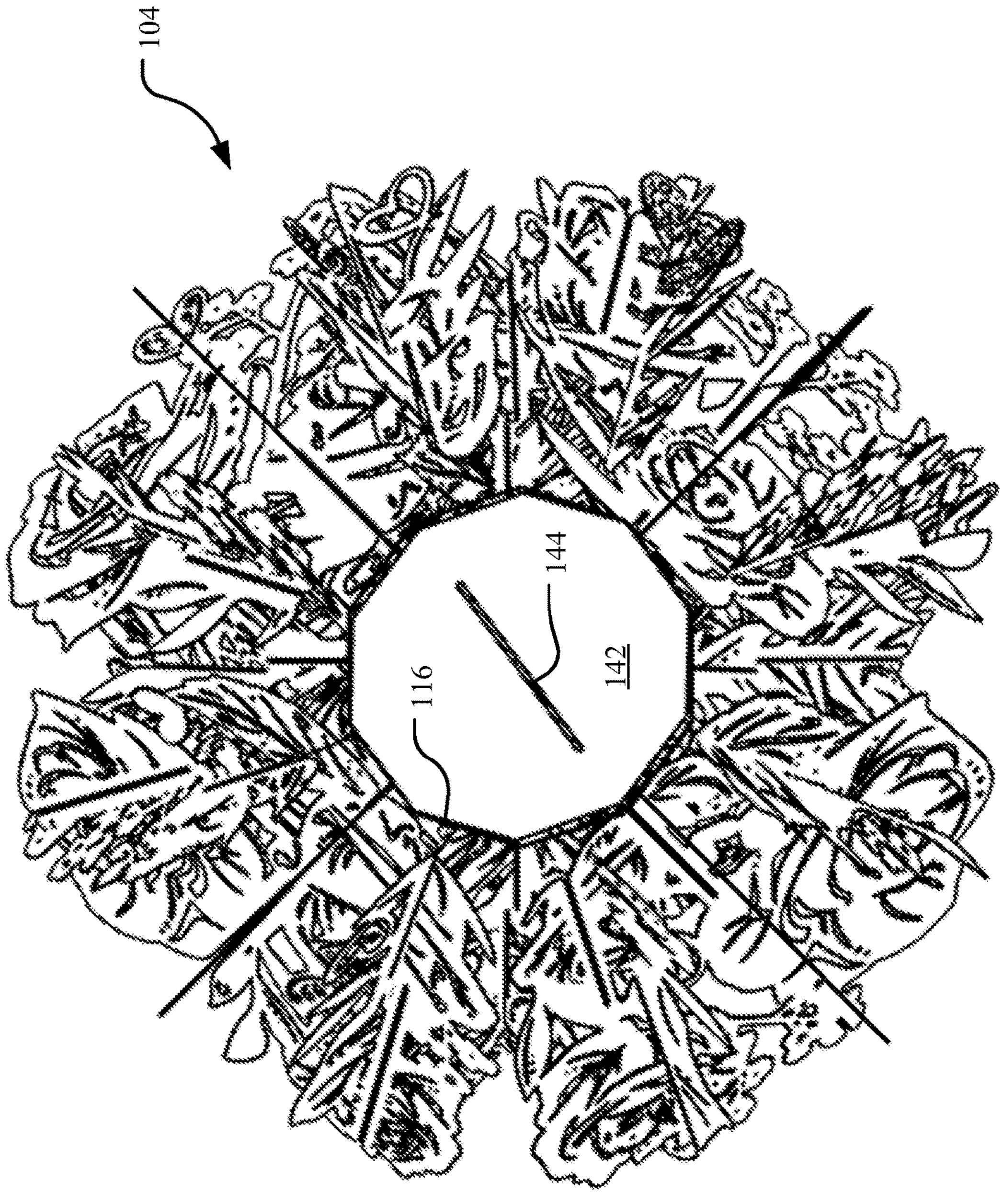
FIG. 5 shows a bottom view of the imitation flower bouquet.
Figure 6:
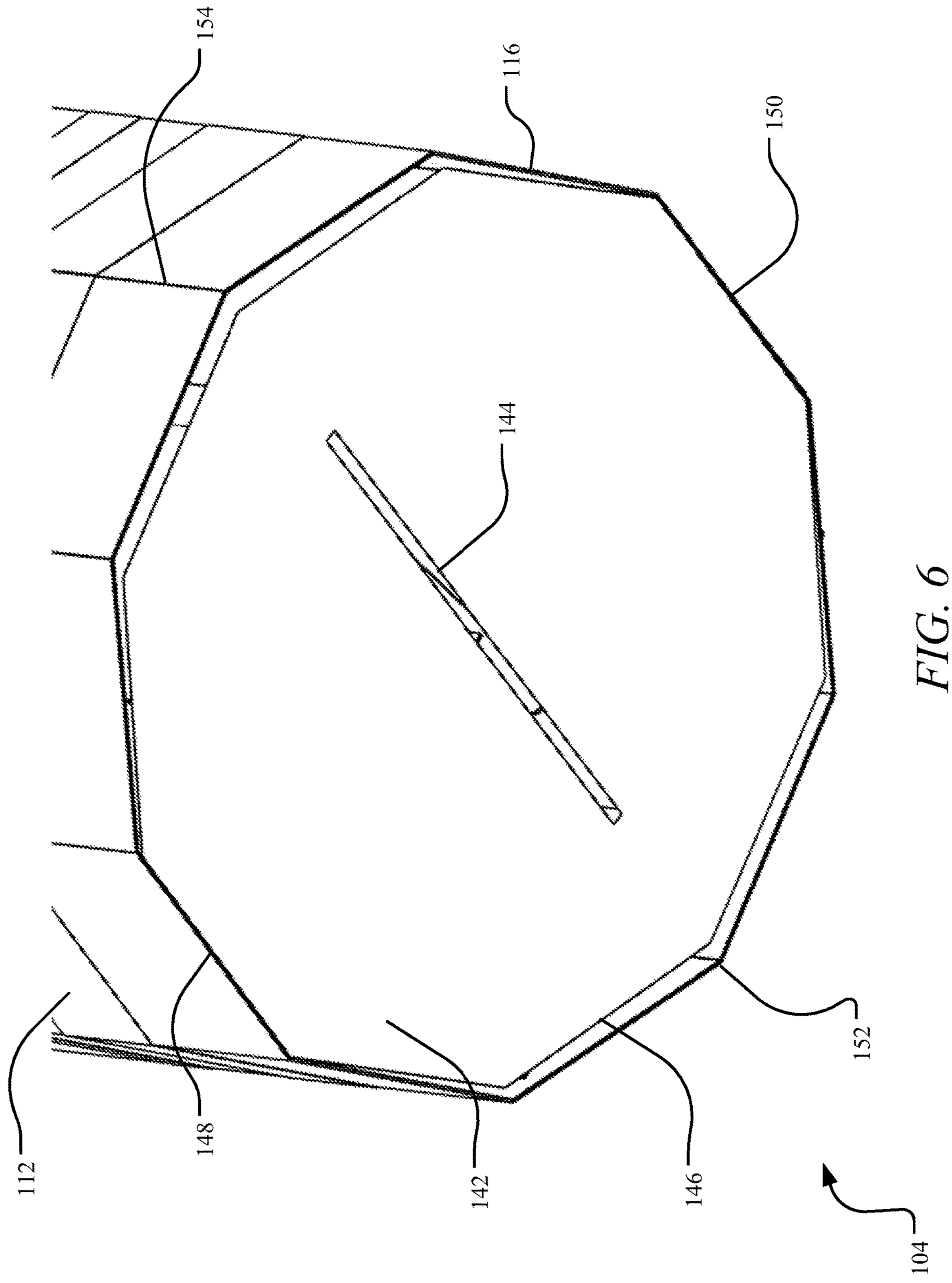
FIG. 6 depicts a bottom perspective detailed view of a distal end of an imitation vase of the imitation flower bouquet.

The decorative portion 106 is mounted to the imitation vase 104 using the base portion. Referring to FIGS. 5-6, in one implementation, the imitation vase 104 includes a base panel 142 disposed relative to the distal edge 116 of the imitation vase 104. The base panel 142 may include a slit 144 disposed along a base fold line. The base panel 142 includes an inner surface disposed opposite an outer surface. A first portion of the base panel 142 may be disposed on a first side of the slit 144, and a second portion of the base panel 142 may be disposed on a second side of the slit 144. As described in more detail herein, the base panel 142 may be used to maintain the imitation flower bouquet 100 in the unfolded position. However, it will be appreciated that the base panel 142 may be eliminated, with the imitation flower bouquet 100 maintained under its own weight in the unfolded position when the distal edge 116 is posited on the display surface.

In one implementation, the base panel 142 includes a base panel edge 146. In the folded position, the first portion of the inner surface the base panel 142 contacts the second portion of the inner surface of the base panel 142 with respective portions of the base panel edge 146 aligned. In the unfolded position, the base panel 142 extends between the base panel edge 146, as shown in FIGS. 5-6. The shape of the base panel 142 formed by the base panel edge 146 may mirror the shape defined by the distal edge 116 when the imitation vase 104 is in the unfolded position. For example, the shape may include a series of angles connected to each other at points corresponding to lines separating the panels 112. The first portion of the base panel 142 may be disposed at an angle relative to the second portion in the unfolded position maintaining the imitation vase 104 and thereby the imitation flower arrangement 102 in the unfolded position. More specifically, the fold line of the base panel 142 may be disposed proximal to the distal edge 116 in an interior formed by the panels 112 of the imitation vase 104, with the first portion and the second portion of the base panel 142 extending distally from the base fold line to the distal edge 116. The imitation flower bouquet 100 may be biased into the folded position, for example under the gravity of its own weight, such that when the base panel 142 is moved distally from the interior of the imitation vase 104 past the distal edge 116, the imitation flower bouquet 100 moves into the folded position.

In one implementation, the base panel 142 is mounted to the imitation vase 104 at one or more base mount lines. For example, the base panel edge 146 may form fold lines at the one or more base mount lines connecting the base panel 142 to the distal edge 116. A reminder of the base panel edge 146 may be loose from the distal edge 116 outside of the base mount lines, thereby permitting the imitation vase 104 to move between the folded and unfolded position. In one implementation, in the folded position, the fold line of the base panel 142 extending along the slit 144 is distal to the distal edge 116. The fold line of the base panel 142 may further extend parallel to the base mount lines and thus the distal edge 116 in the folded position.

The base mount lines may correspond to a first mount panel 148 and a second mount panel 150. For example, a first base mount line may extend along a length of a first portion of the distal edge 116 corresponding to the first mount panel 148, and a second base mount line may extend along a length of a second portion of the distal edge 116 corresponding to the second mount panel 150. The mount panels 148-150 correspond to the one or more connections mounting the imitation vase 104 to the imitation flower arrangement 102 in the translational relationship. For example, a first connection of the set of connections may be formed by the outer base 110 being mounted to an inner surface of the first mount panel 148 along a first connection line, and a second connection of the set of connections may be formed by the outer base 110 being mounted to an inner surface of the second mount panel 150 along a second connection line.

The one or more fold lines 118 may be disposed relative to the mount panels 148-150. In one implementation, the one or more fold lines 118 include a first fold line 152 and a second fold line 154. In one implementation, in the folded position, the mount panels 148-150 extend along the axis 120, with the first connection line and the second connection line centered on the axis 120. The axis 120 extends transverse to and intersects a center of the fold line of the base panel 142 in the folded position. The fold lines 152 and 154 may be disposed parallel to each other and the axis 120 in the folded position. The imitation vase 104 extends longitudinally between the fold lines 152 and 154 in the folded position. A first flat surface and a second flat surface of the imitation vase 104 are formed in the folded position. The first flat surface and the second flat surface each extend parallel to each other between the fold lines 152 and 154 and the proximal edge 114 and the distal edge 116. In this manner, the imitation flower arrangement 102 is sandwiched between the first flat surface and the second flat surface of the imitation vase 104 in the folded position.

An application of force on one or more portions of the imitation vase 104 may move the imitation vase 104 from the folded position to the unfolded position. The force may be applied at one or more of the panels 112 and/or the base panel 142. In one example, the force is applied along the fold lines 152-154 in a longitudinal direction towards the axis 120. In another example, the force is applied at the base panel 142 in a proximal direction towards the distal edge 116. The application of force causes the imitation vase 104 to move relative to axis 120. The fold lines 152 and 154 each move inward in a longitudinal direction towards the axis 120, while the mount panels 148 and 150 each move outward in a transverse direction away from the axis 120 until the unfolded position of the imitation vase 104 is reached. Simultaneously, the base panel 142 moves in the proximal direction towards the distal edge 116 until the slit 144 and the fold line of the base panel 142 is disposed within an interior of the imitation vase 104 proximal to the distal edge 116 in the unfolded position. In one implementation, the base portion prevents the slit 144 from continuing to move proximally within the interior of the imitation vase 104 past the unfolded position.

The slit 144 may maintain the base panel 142 and thereby the imitation vase 104 in the unfolded position. More particularly, in one implementation, the slit 144 is defined by a first slit edge and a second slit edge extending parallel to each other and the fold line of the base panel 142. When disposed in the folded position, the first slit edge and the second slit edge are separated from each other forming the slit 144. In the unfolded position, the first slit edge is in contract with the second slit edge in a frictional relationship. The frictional relationship creates an outward force against the panels 112 at the base mount lines, maintaining the imitation vase 104 in the unfolded position. In the unfolded position, the fold lines 152 and 154 may be diametrically opposed to each other, and the mount panels 148 and 150 may be diametrically opposed to each other. The fold lines 152-154 and the mount panels 148-150 may further be spaced equidistant from each other about the axis 120. By applying a force displacing the base panel 142 distally from the unfolded position, the imitation vase 104 moves from the unfolded position to the folded position.

Figure 7:
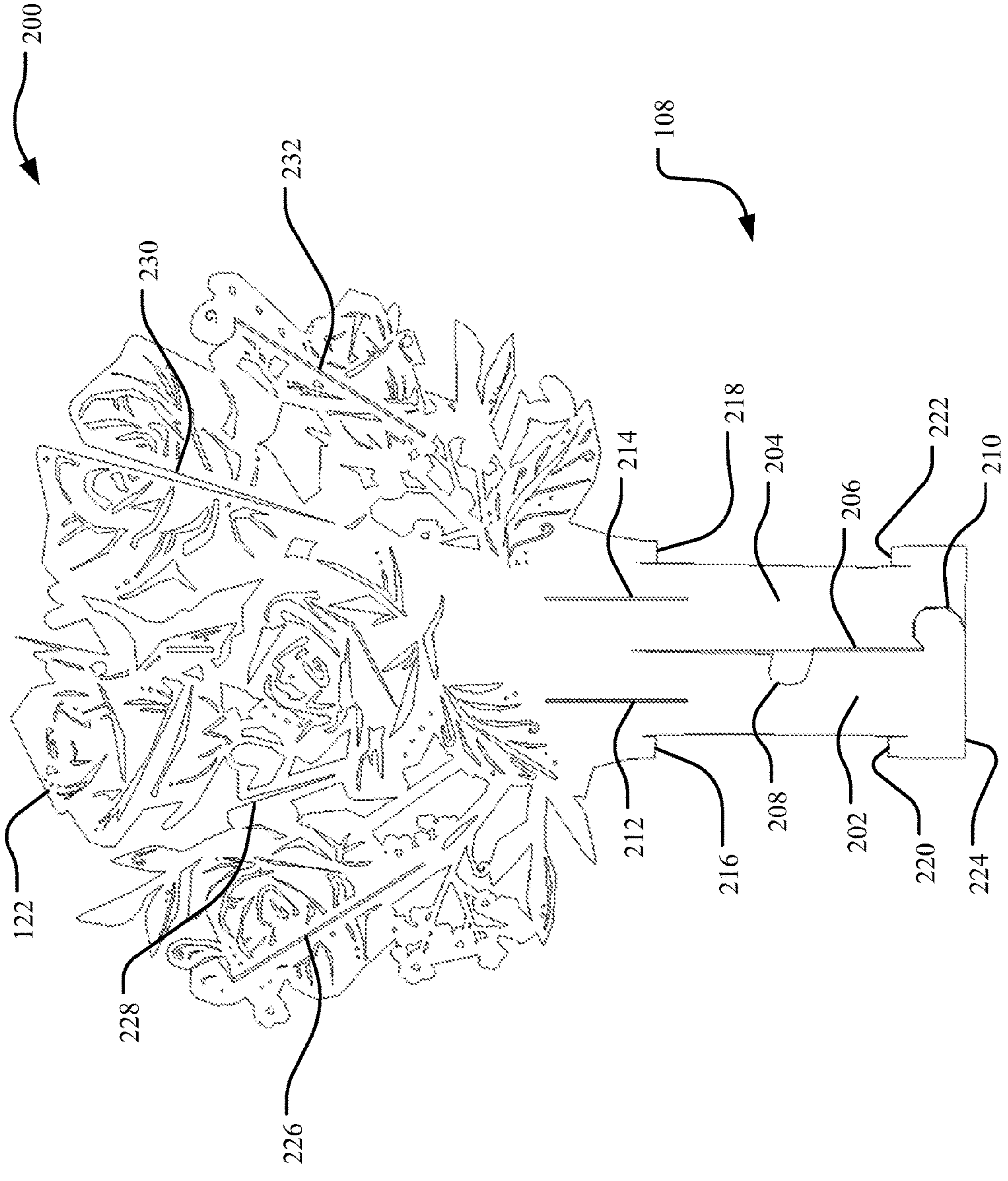
FIG. 7 illustrates a first central panel of the imitation flower arrangement.

As described herein, movement of the imitation vase 104 is translated to the imitation flower arrangement 102 using the set of connections, thereby moving the imitation flower arrangement 102 between the folded position and the unfolded position simultaneously with the imitation vase 104. Turning to FIG. 7, in one implementation, the imitation flower arrangement 102 includes a first central panel 200. The first central panel 200 may be a single integrated panel or comprised of a plurality of panels connected to each other. The first central panel 200 includes the first central decorative panel 122 at a proximal end and one or more imitation stem panels of the inner base 108 at a distal end. It will be appreciated that the imitation stem panels may be substituted with other imitation panels (e.g., imitation trunk panels, imitation pole panels, imitation structure panels, imitation object panels, etc.) depending on a nature of the decorative portion 106.

In one implementation, the one or more imitation stem panels includes a first imitation stem panel 202 and a second imitation stem panel 204. The first imitation stem panel 202 may be separated from the second imitation stem panel 204 by a distal panel slit 206. The distal panel slit 206 may extend along the axis 120. A first tab 208 may extend from the second imitation stem panel 204 across the axis 120 into a corresponding cutout of the first imitation stem panel 202. Similarly, a second tab 210 may extend from the first imitation stem panel 202 across the axis 120 into a corresponding cutout of the second imitation stem panel 204. The inner base 108 further includes a first mount slit 212 and a second mount slit 214. The mount slits 212-214 may be disposed at a proximal end of the first imitation stem panel 202 and the second imitation stem panel 204, respectively, and a distal edge 224 may be disposed at a distal end of the of the first imitation stem panel 202 and the second imitation stem panel 204. A first set of proximal stem tabs 216 and 218 may be disposed opposite a first set of distal stem tabs 220 and 222. The first imitation stem panel 202 may include the stem tabs 216 and 220, and the second imitation stem panel 204 may include the stem tabs 218 and 222.

At the proximal end of the first central panel 200, the first central decorative panel 122 may include one or more first decorative panel slits (e.g., 226-232). Using these various features, the first central panel 200 may connect with other panels and/or portions of the imitation flower bouquet 102. For example, the first decorative panel slits 226-232 may be used to engage the decorative panels 134-140. The first decorative panel slits 226-232 may extend distally at an angle inwardly toward the axis 120 to orient the decorative panels 134-140 in the angled relationship, as described herein.

Figure 8:
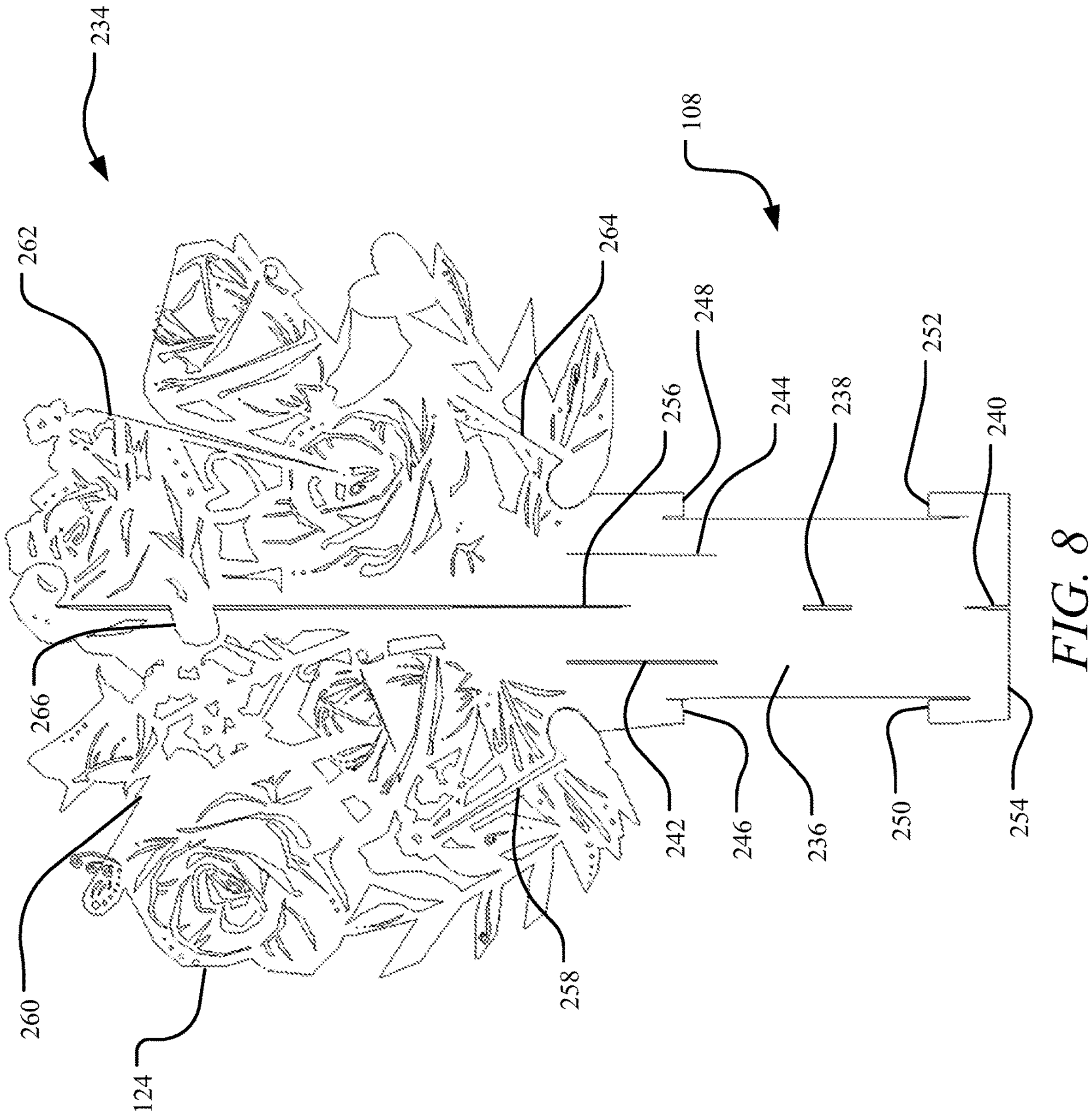
FIG. 8 shows a second central panel of the imitation flower arrangement.

The first central panel 200 may be configured to engage a second central panel 234, which may similarly be a single integrated panel or comprised of a plurality of panels connected to each other. Referring to FIG. 8, in one implementation, second central panel 234 includes the second central decorative panel 124 at a proximal end and one or more imitation stem panels of the inner base 108 at a distal end. Again, it will be appreciated that the imitation stem panels may be substituted with other imitation panels depending on a nature of the decorative portion 106.

In one implementation the one or more imitation stem panels includes a third imitation stem panel 236 including a first tab slit 238 and a second tab slit 240. The tab slits 238-240 may be disposed along the axis 120. The inner base 108 further includes a third mount slit 242 and a fourth mount slit 244. The mount slits 242-244 may be disposed at a proximal end of the third imitation stem panel 236 and a distal edge 254 may be disposed at a distal end of the third imitation stem panel 236. A second set of proximal stem tabs 246 and 248 may be disposed opposite a second set of distal stem tabs 250 and 252. At the proximal end of the second central panel 234, a proximal panel slit 256 may extend distally along the axis 120. Additionally, the second central decorative panel 124 may include one or more second decorative panel slits (e.g., 258-264). The second decorative panel slits 258-264 may be used to engage the decorative panels 126-132. The first decorative panel slits 258-264 may extend distally at an angle inwardly toward the axis 120 to orient the decorative panels 126-132 in the angled relationship, as described herein. The first central decorative panel 122 and/or the second central decorative panel 124 may include one or more decorative tabs 266 extending across the axis 120 into a corresponding cutout.

The first central panel 200 may be connected to the second central panel 234 along the axis 120. In one implementation, the proximal end of the first central panel 200 is disposed within the proximal panel slit 256, and the distal end of the second central panel 234 is disposed within the distal panel slit 206, thereby engaging the first central panel 200 to the second central panel 234 along the axis 120. Stated differently, when the first central panel 200 is engaged to the second central panel 234, the proximal slit 256 and the distal slit 206 extend along the axis 120. To maintain the engagement while facilitating movement between the unfolded position and the folded position, the tabs 208 and 210 extend through the tab slits 238 and 240, respectively into their corresponding cutouts. The decorative tabs 266 may similar extend through decorative slits into corresponding cutouts. A set of mounts may extend through the mount slits 212, 214, 242, and 244 to fix the first central panel 200 to the second central panel 234 while permitting movement between the folded position and the unfolded position about the axis 120. In the folded position, the first central panel 200 is layered over the second central panel 234, with each extending longitudinally in a same direction. In moving to the unfolded position, the central panels 200 and 234 pivot with respect to each other about the axis 120. In the unfolded position the first central panel 200 extends transverse to the second central panel 234.

Figure 9:
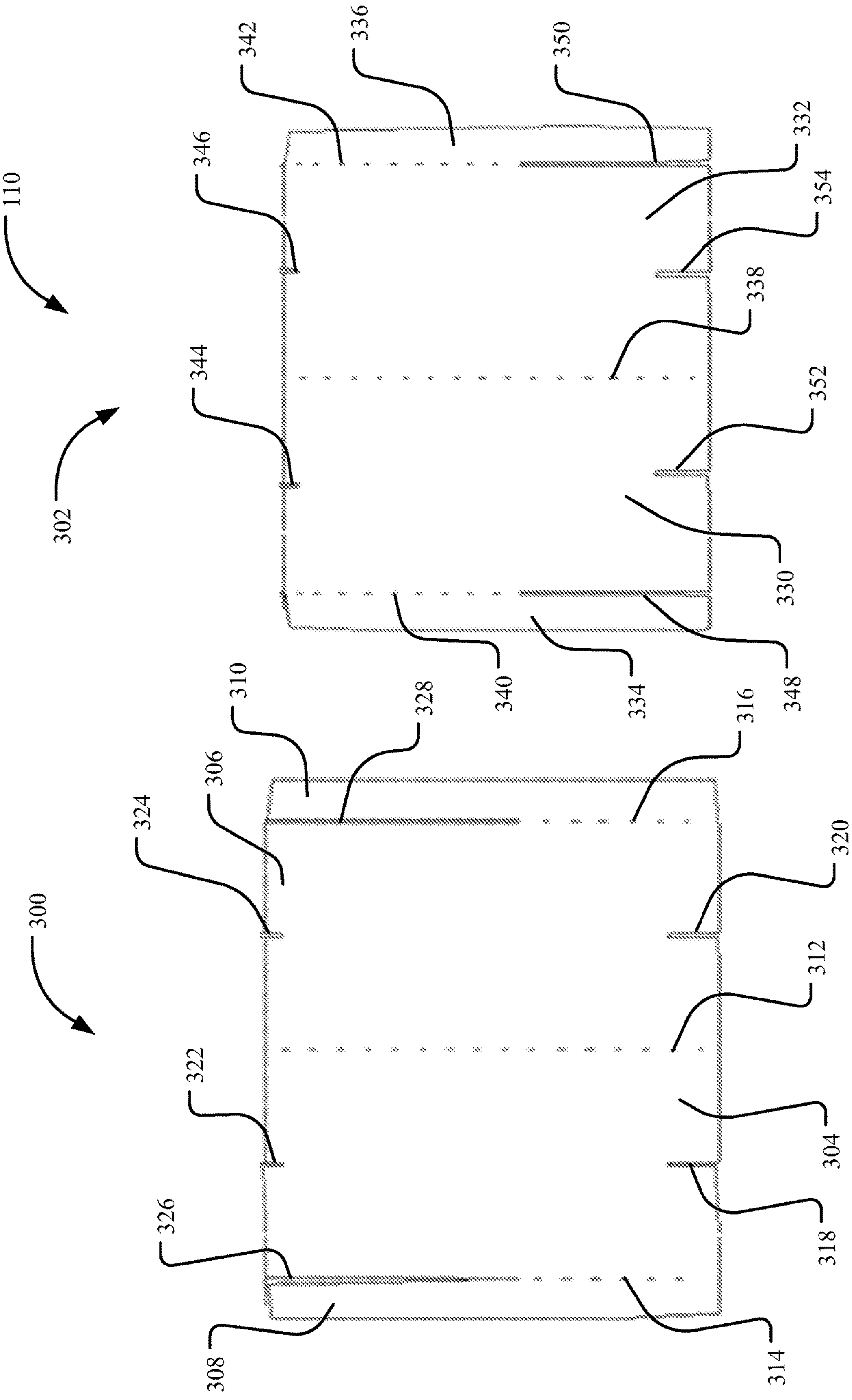
FIG. 9 shows example base sheets of an outer base prior to assembly.

The outer base 110 mounts the inner base 108 to the imitation vase 104 to translate movement of the imitation vase 104 between the folded position and unfolded position to the imitation flower arrangement 102. Turning to FIG. 9, in one implementation, the outer base 110 includes a first base panel 300 and a second base panel 302. Although shown as a set of two separate panels, it will be appreciated that the outer base 110 may comprise one or more base panels.

In one implementation, the first base panel 300 includes a first portion 304 and a second portion 306 separated from each other by a first primary fold line 312. The first base panel 300 further includes a first mount surface 308 and a second mount surface 310. The first mount surface 308 is separated from the first portion 304 by a first mount fold line 314, and the second mount surface 310 is separated from the second portion 306 by a second mount fold line 316. A first base slit 326 may be defined in the first base panel 300 relative to the first mount fold line 314, and a second base slit 328 may be defined in the second base panel 300 relative to the second mount fold line 316. The first base panel 300 further includes a first set of proximal slits 322 and 324 and a first set of distal slits 318 and 320.

Similarly, the second base panel 300 includes a third portion 330 and a fourth portion 332 separated from each other by a second primary fold line 338. The second base panel 302 further includes a third mount surface 334 and a fourth mount surface 336. The third mount surface 334 is separated from the third portion 332 by a third mount fold line 340, and the fourth mount surface 336 is separated from the fourth portion 336 by a fourth mount fold line 342. A third base slit 348 may be defined in the second base panel 302 relative to the third mount fold line 340, and a fourth base slit 350 may be defined in the second base panel 302 relative to the fourth mount fold line 342. The second base panel 302 further includes a second set of proximal slits 344 and 346 and a second set of distal slits 352 and 354.

In one implementation, the inner base 108 is mounted to the outer base 110 using the stem tabs 216, 218, 220, 222, 246, 248, 250, and 252. In one example, the stem tab 216 is mounted to the slit 324; the stem tab 246 is mounted to the slit 322; the stem tab 218 is mounted to the slit 344; the stem tab 248 is mounted to the slit 346; the stem tab 220 is mounted to the slit 320; the stem tab 222 is mounted to the slit 252; the stem tab 250 is mounted to the slit 318; and the stem tab 252 is mounted to the slit 254. The inner base 108 is mounted to the outer base 110 in this manner to facilitate movement between the folded position and the unfolded position with any movement of the outer base 110 translating to the inner base 108 and thus the decorative portion 106.

In one implementation, the first base panel 300 is mounted to the second base panel 302 at the mount surfaces 308-310 and 334-336 using the base slits 326-328 and 348-350. The first base slit 326 engages the third base slit 348 aligning the first mount fold line 314 with the third mount fold line 340 to form a first primary mount fold line. Additionally, connection of the base slits 326 and 348 with each other disposes the first mount surface 308 relative to the third mount surface 334 to form a first connecting surface. Similarly, the second base slit 328 engages the fourth base slit 350 aligning the second mount fold line 316 with the fourth mount fold line 342 to form a second primary mount fold line. Additionally, connection of the base slits 328 and 350 with each other disposes the second mount surface 310 relative to the fourth mount surface 336 to form a second connecting surface. Once the first base panel 300 is connected to the second base panel 302 to form the outer base 110, the first primary fold line 312 is disposed opposite the second primary fold line 338.

In one implementation, the first connecting surface is mounted to the first mount panel 148 of the imitation vase 104, and the second connecting surface is mounted to the second mount panel 150. The first connecting surface may be mounted to the first mount panel 148 to form a first connection, such that the first primary fold line forms the first connection line, and the second connecting surface may be mounted to the second mount panel 150 to form a second connection, such that the second primary fold line forms the second connection line. The first connection line may extend parallel to the second connection line and the axis 120 along a first plane. The first primary fold line 312 extends parallel to the second primary fold line 338 and the axis 120 along a second plane transverse to the first plane. Outside of the first connection and the second connection, the remainder of the outer base 110 may be loose from the imitation vase 104 to permit movement between the folded position and the unfolded position.

The outer base 110 folds along the first connection line, the second connection line, the first primary fold line 312, and the second primary fold line 338 during movement between the folded position and the unfolded position. In one implementation, in the folded position, the outer base 110 extends longitudinally between the first primary fold line 312 and the second primary fold line 338, which are disposed relative to the first fold line 152 and the second fold line 154, respectively. Thus, in the folded position, the outer base 104 forms a first side and a second side with the inner base 108 sandwiched therebetween. The first side includes the first portion 304 and the third portion 330, and the second side includes the second portion 306 and the fourth portion 332.

As described herein, an application of force causes the imitation vase 104 to move relative to axis 120, which is translated to the outer base 110 using the first connection and the second connection. The primary fold lines 312 and 338 each move inward in a longitudinal direction towards the axis 120, while the first connection line and the second connection line each move outward in a transverse direction away from the axis 120 until the unfolded position of the outer base 110 is reached. In the unfolded position, the primary fold lines 312 and 338 may be diametrically opposed to each other, and the connection lines may be diametrically opposed to each other. The primary fold lines 312 and 338 and the connection lines may further be spaced equidistant from each other about the axis 120. In one implementation, the folded position and the unfolded position of the outer base 110 mirrors those of the imitation vase 104.

Figure 10:
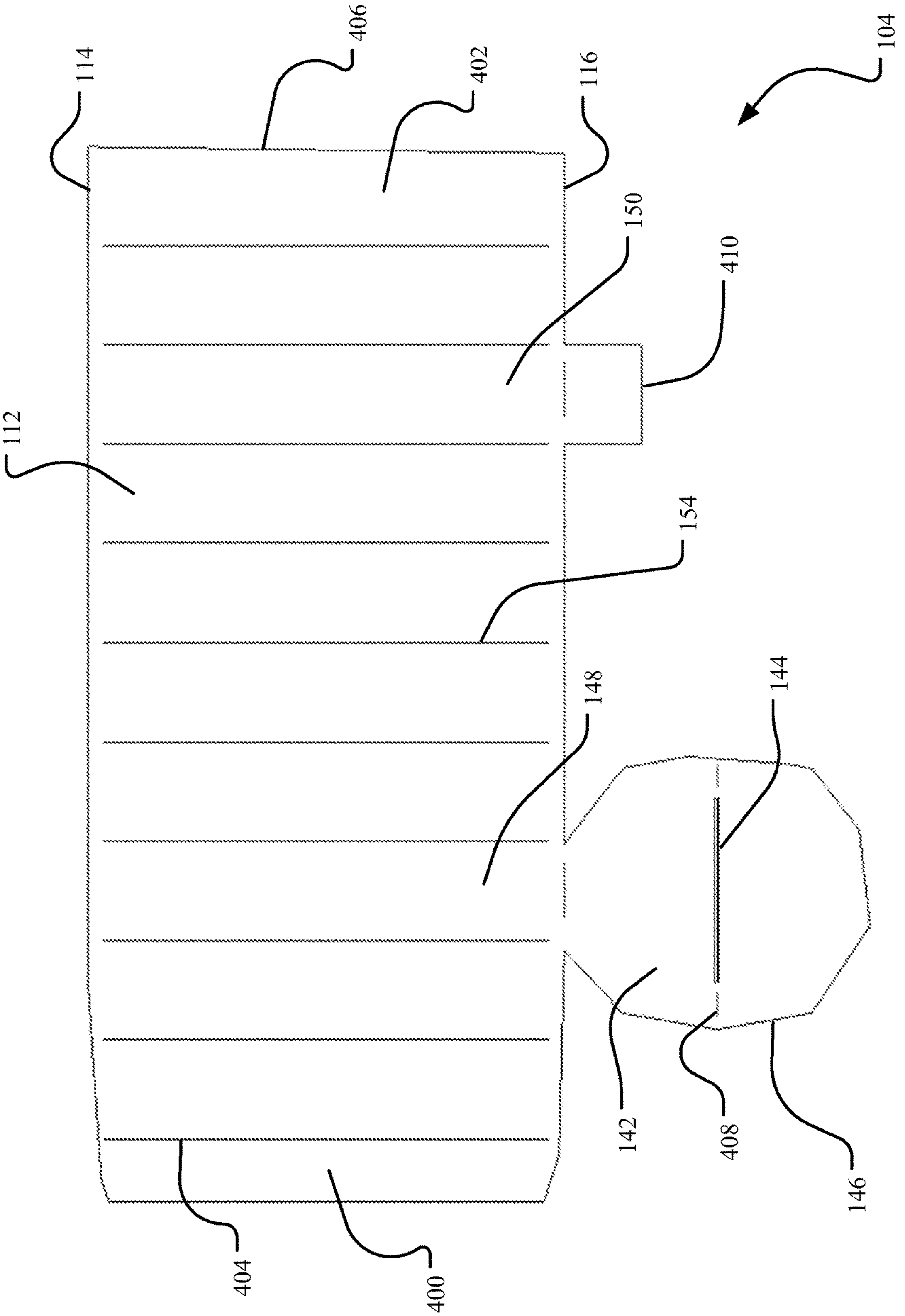
FIG. 10 illustrates an example vase sheet of the imitation vase prior to assembly.

Turning to FIG. 10, in one implementation, the imitation vase 104 is made from a single integrated vase sheet. However, it will be appreciated that the imitation vase 104 may be made from any number of sheets.

In one implementation, the imitation vase 104 includes a first vase mount panel 400 that connects to a second vase mount panel 402 to form a continuous shape of the imitation vase 104 extending between the proximal edge 114 and the distal edge 1156 and including the plurality of panels 112. Once the vase mount panels 400 and 402 are connected to each other, in one implementation, an edge 404 of the first vase mount panel 400 aligns with an edge 406 of the second vase mount panel 402 to form the first fold line 152. Each of the panels 112 may be connected to each other along such panel fold lines.

Figure 11:
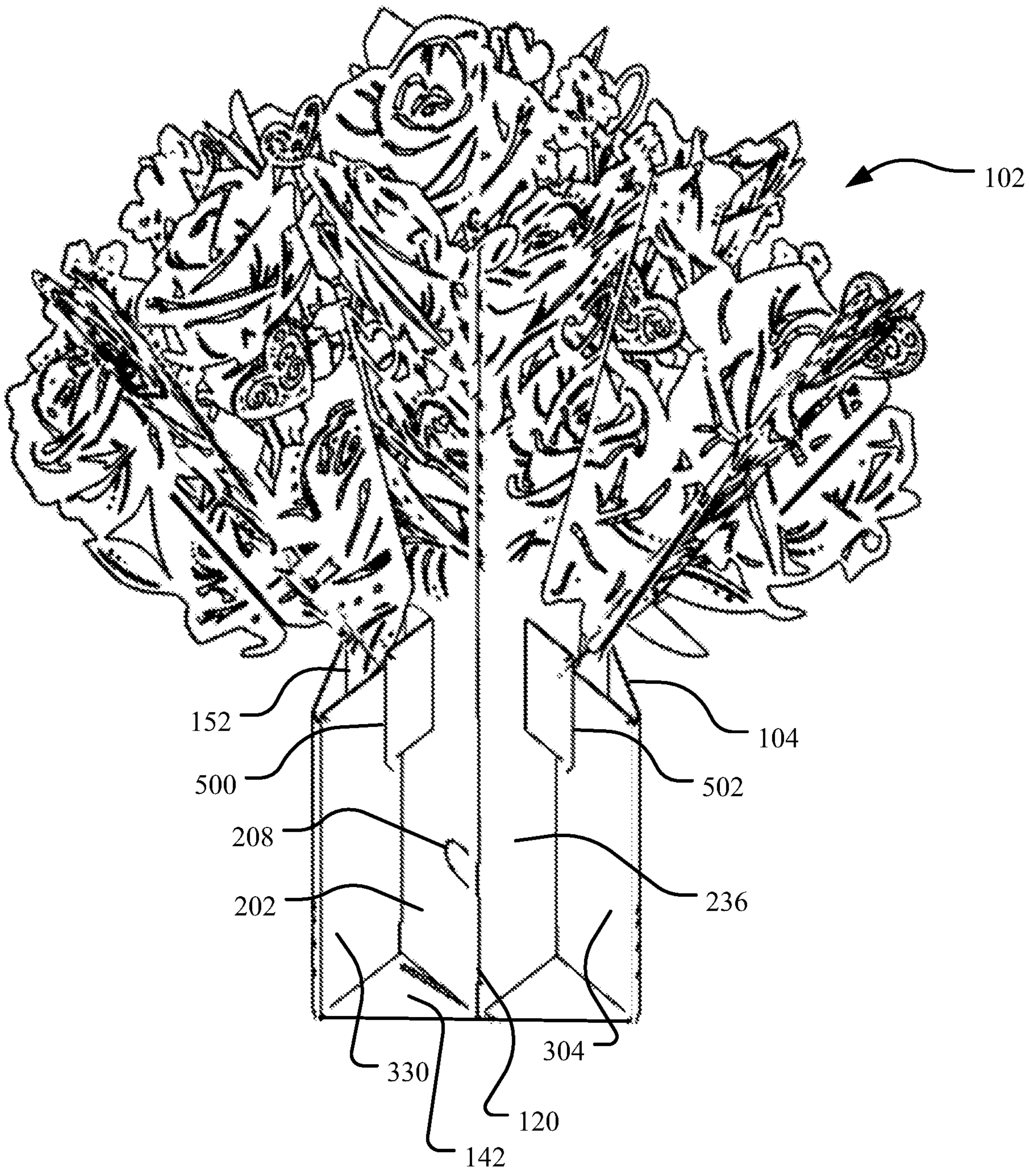
FIG. 11 depicts a top front perspective cross-sectional view of the imitation flower bouquet taken along a height of the imitation flower bouquet.
Figure 12:
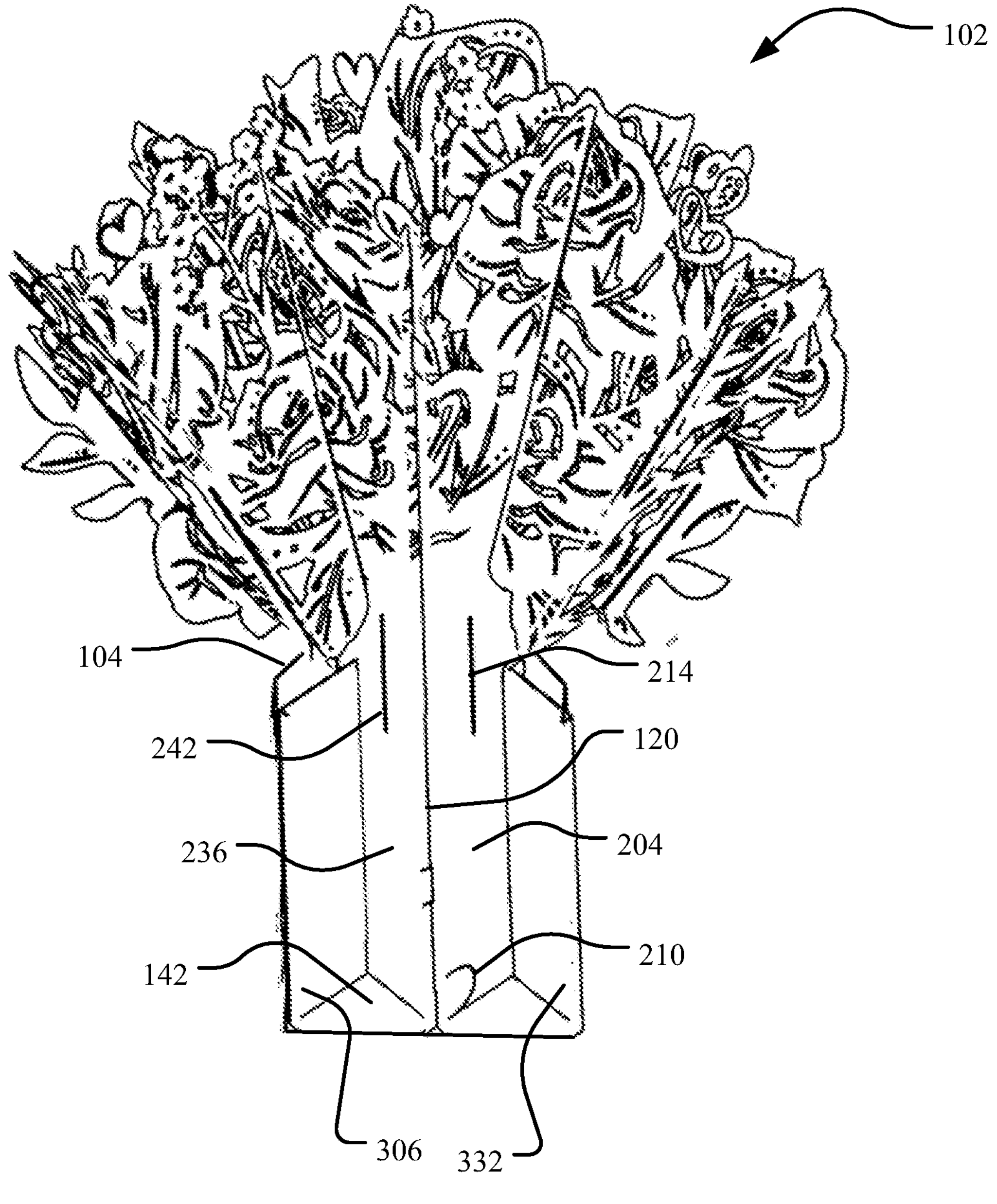
FIG. 12 depicts a top side perspective cross-sectional view of the imitation flower bouquet taken along a height of the imitation flower bouquet.

As can be understood from FIG. 10, the base panel 142 is connected to the first mount panel 148 and the second mount panel 150 along the base mount lines. The base panel 142 may be integral with one or more of the mount panels 148 and 150, connected to the mount panels 148 and 150 using a mount tab 410, and/or the like. As described herein, the base panel 142 includes a base fold line 408 along which the base panel 142 folds as the imitation flower bouquet 100 moves between the folded position and the unfolded position. The slit 144 may be used to maintain the imitation flower bouquet 100 in the unfolded position, as illustrated in FIGS. 11-12. A first mount 500 and a second mount 502 may be used to connect the first central panel 200 with the second central panel 232, as described herein.

Figure 13:
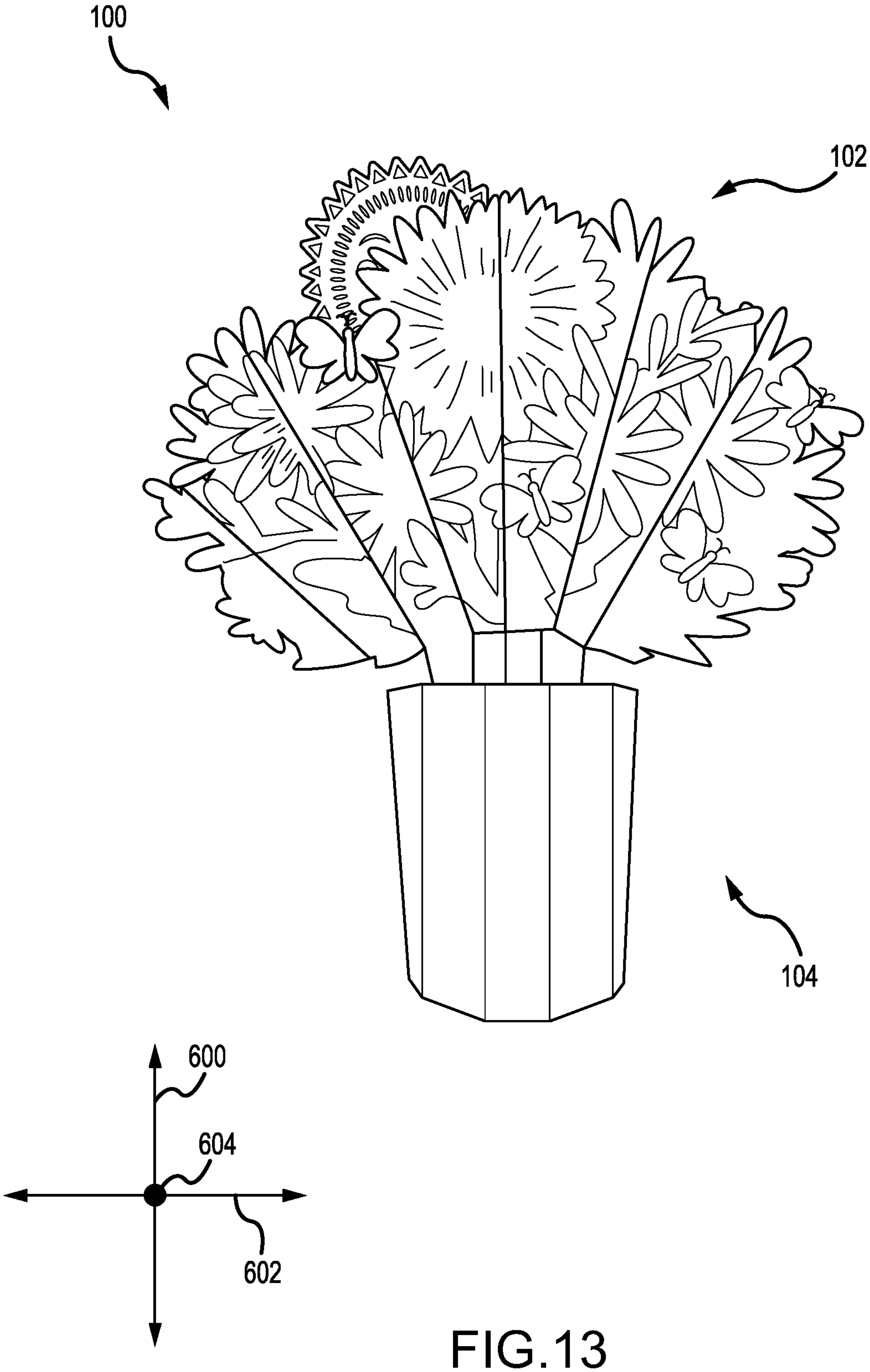
FIG. 13 illustrates an example imitation flower bouquet in an unfolded position.
Figure 14:
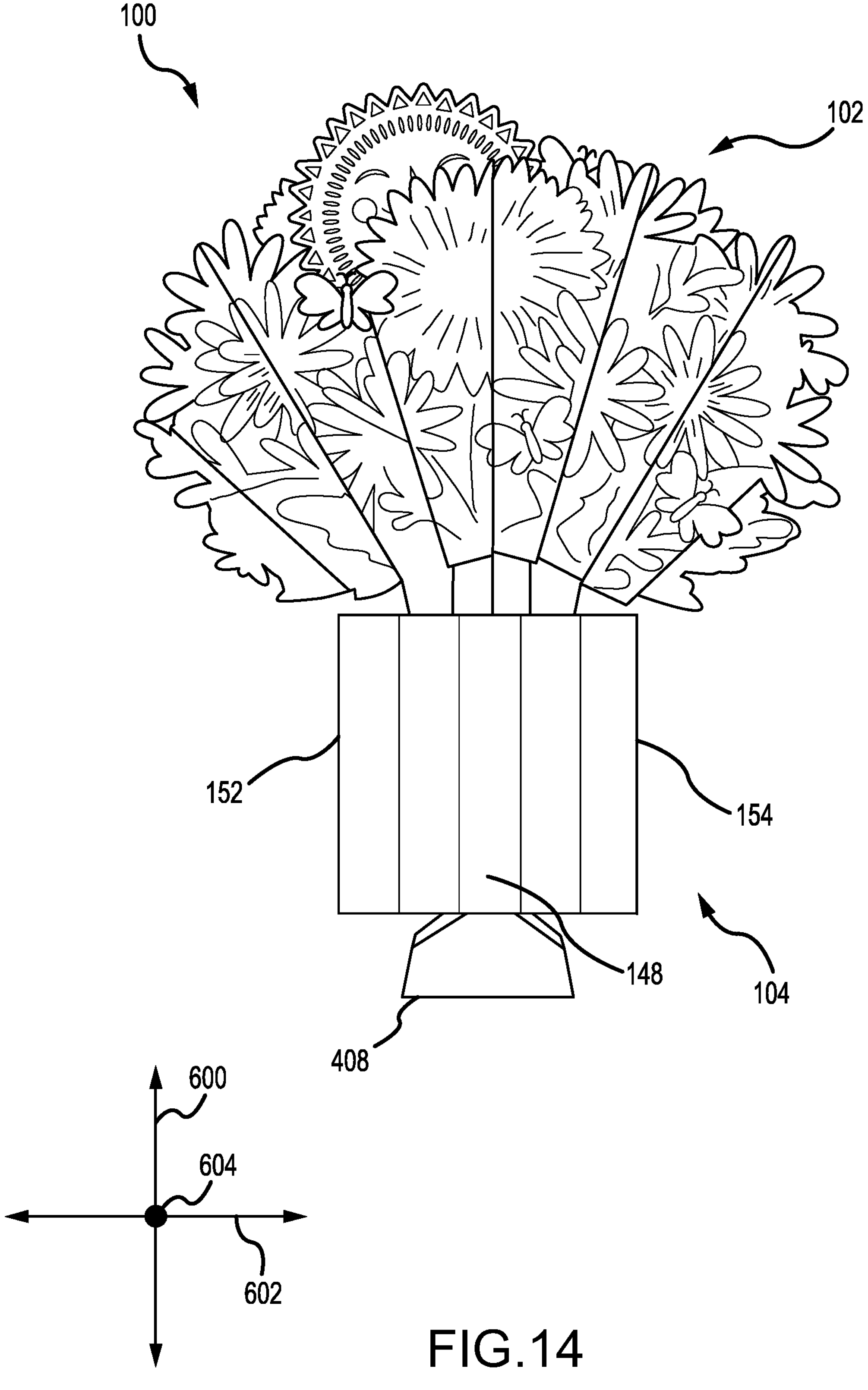
FIG. 14 shows the imitation flower bouquet in a folded position.
Figure 15:
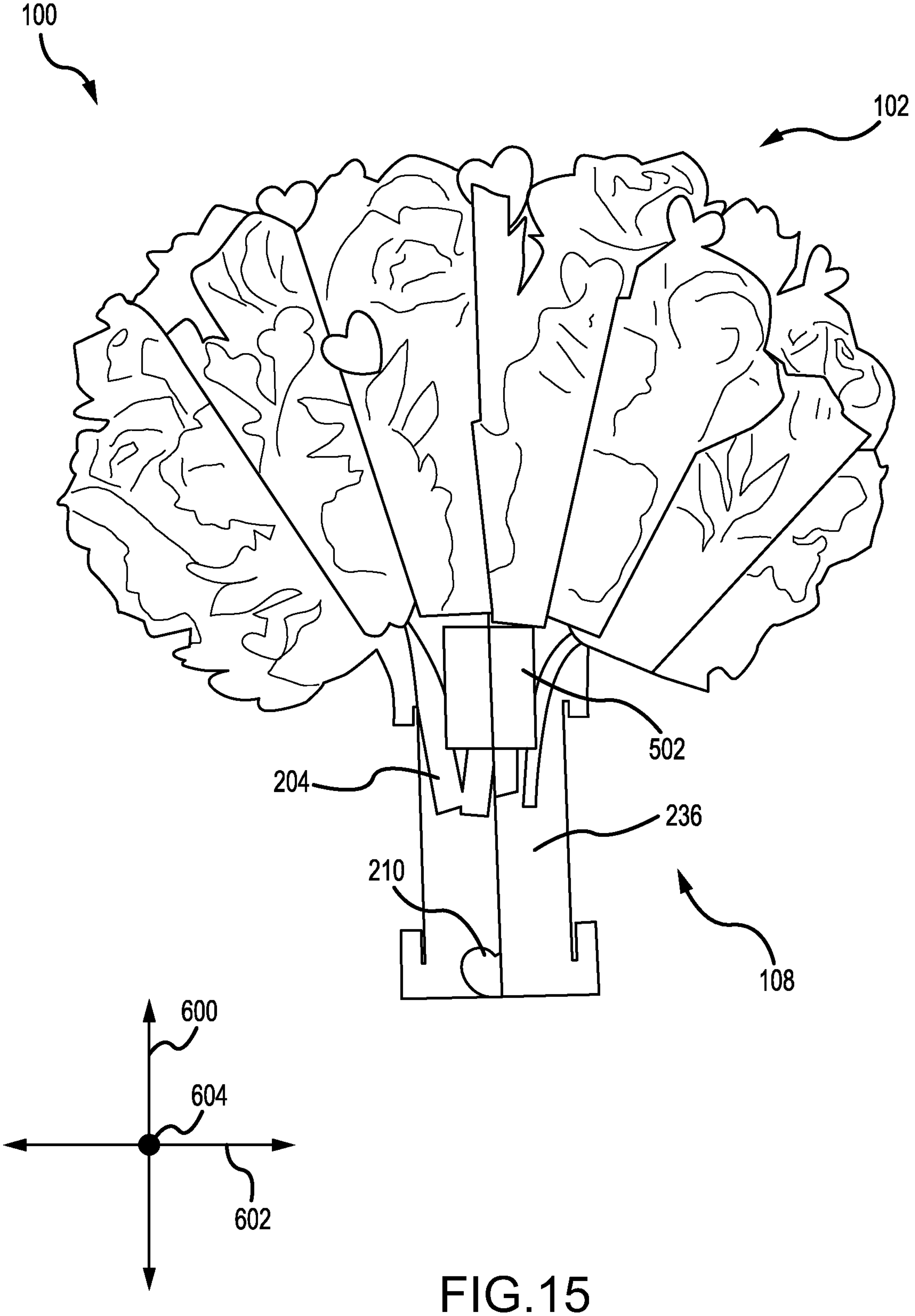
FIG. 15 shows an example imitation flower arrangement in a folded position.
Figure 16B:
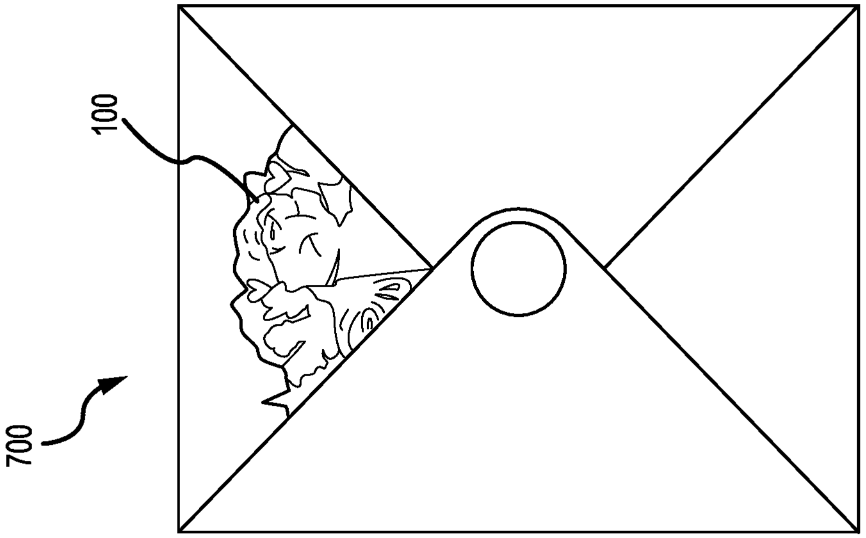
FIG. 16B shows an example imitation flower bouquet in a folded position in the envelope with a proximal envelope panel not shown for clarity.
Figure 16A:
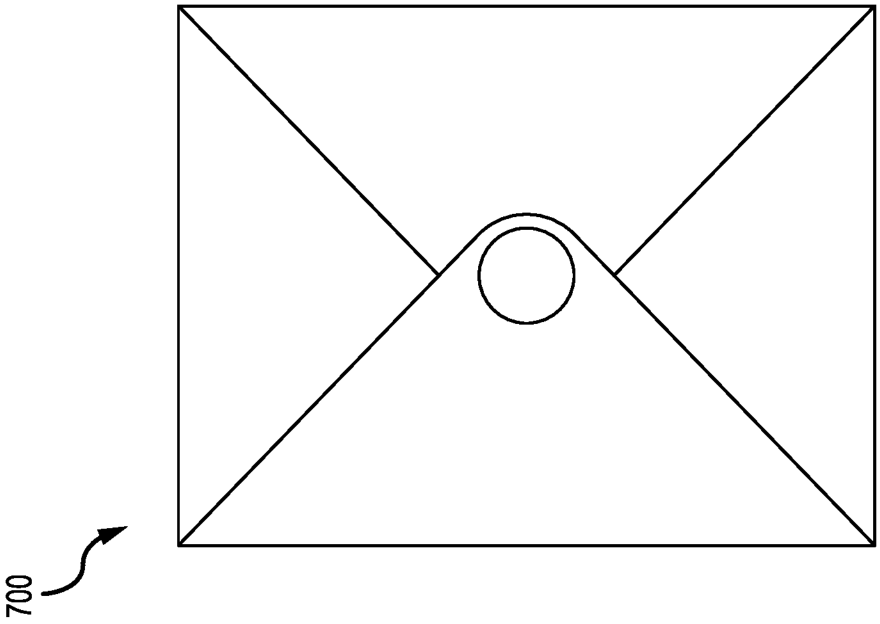
FIG. 16A depicts a front view of an example envelope.
Figure 17B:
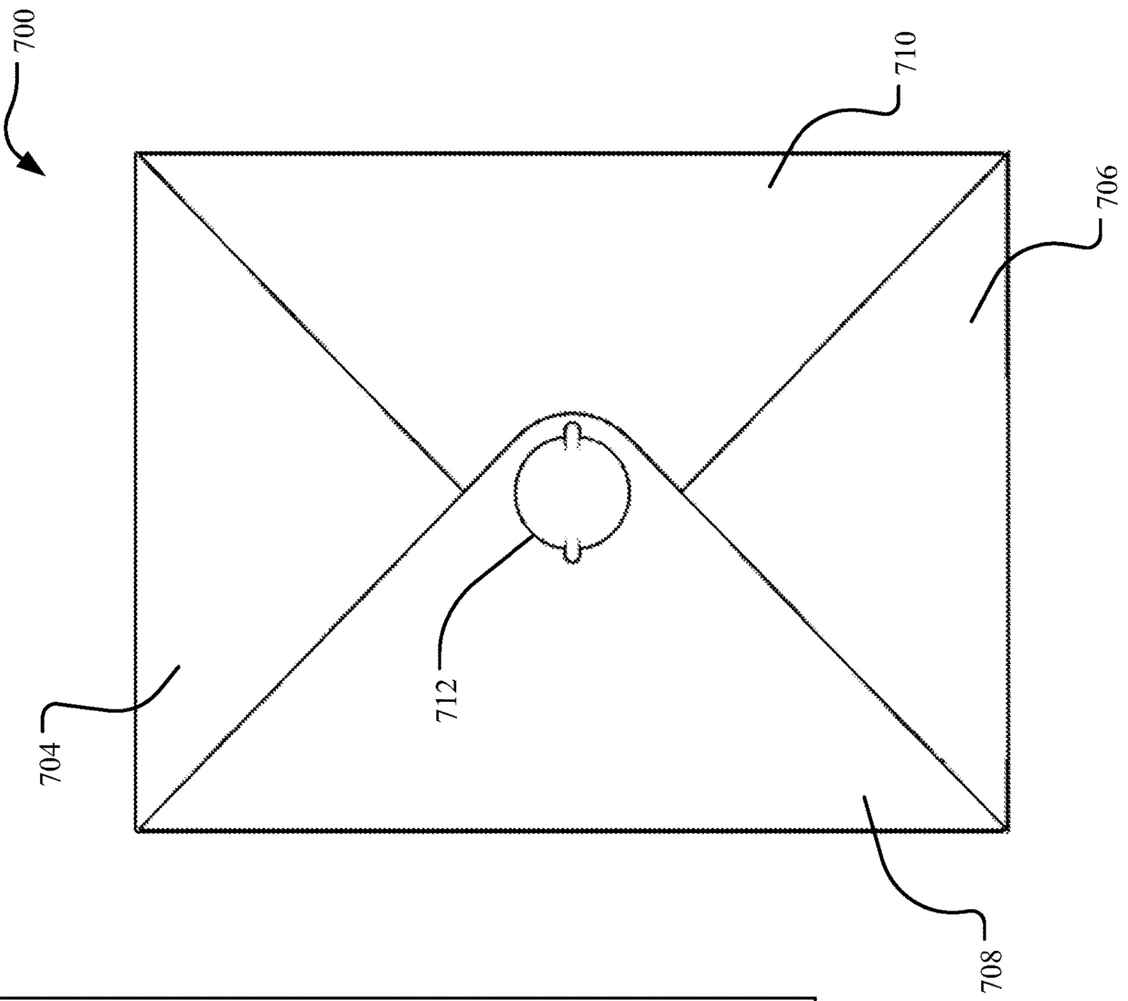
FIG. 17B shows a front view of the envelope.
Figure 17A:
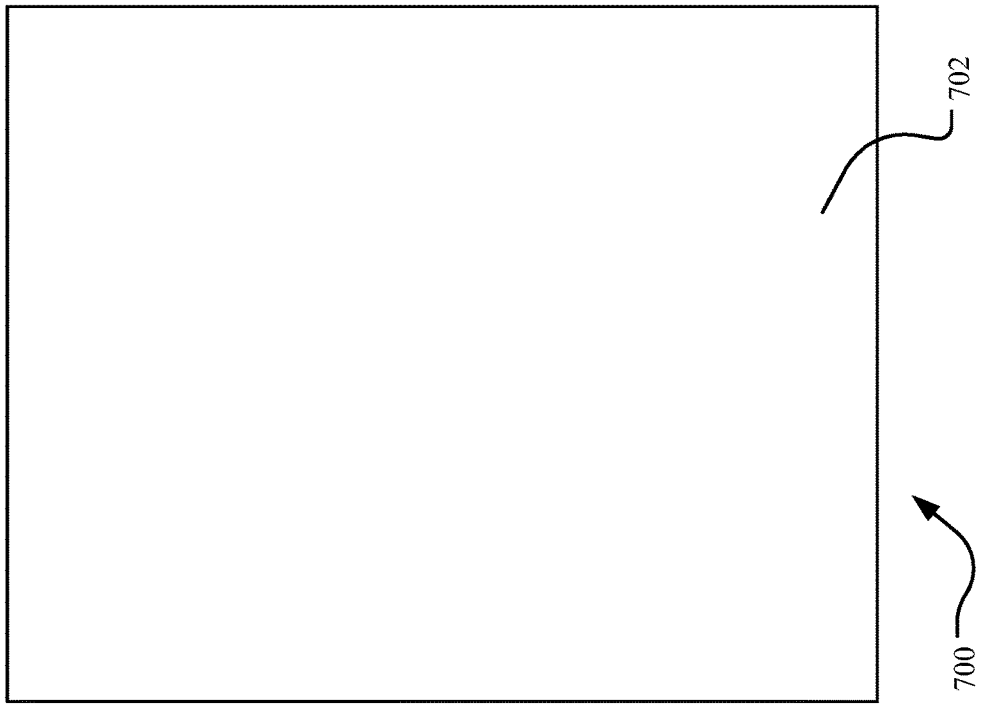
FIG. 17A illustrates a back view of an example envelope.
Figure 18A:
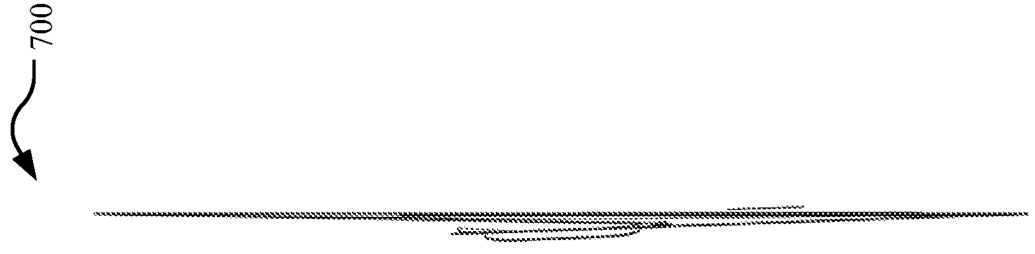
FIG. 18A depicts a right side view of the envelope.
Figure 18B:
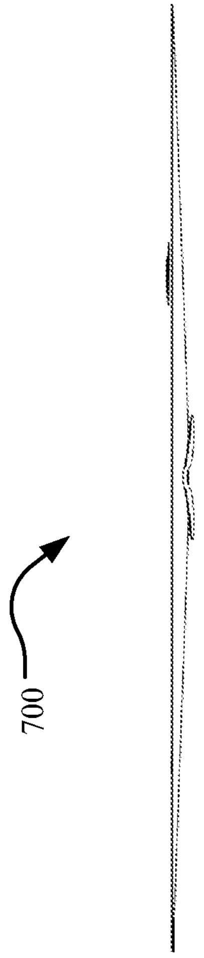
FIG. 18B shows a top view of the envelope.
Figure 18C:
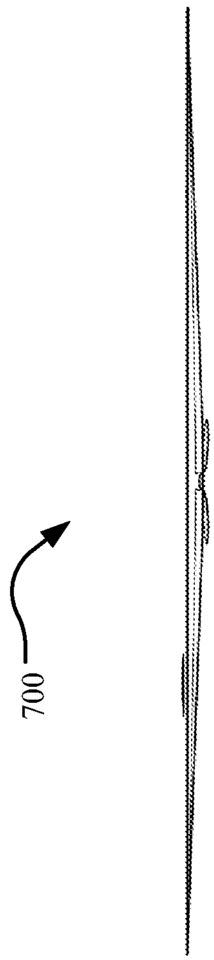
FIG. 18C shows a bottom view of the envelope.
Figure 18D:
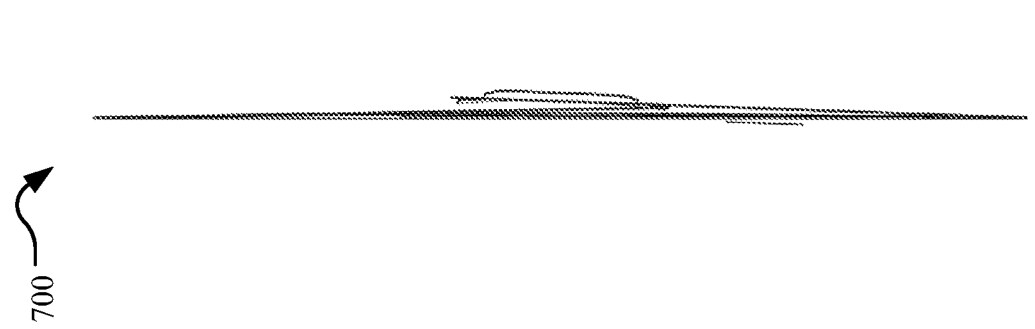
FIG. 18D shows a left side view of the envelope.
Figure 19:
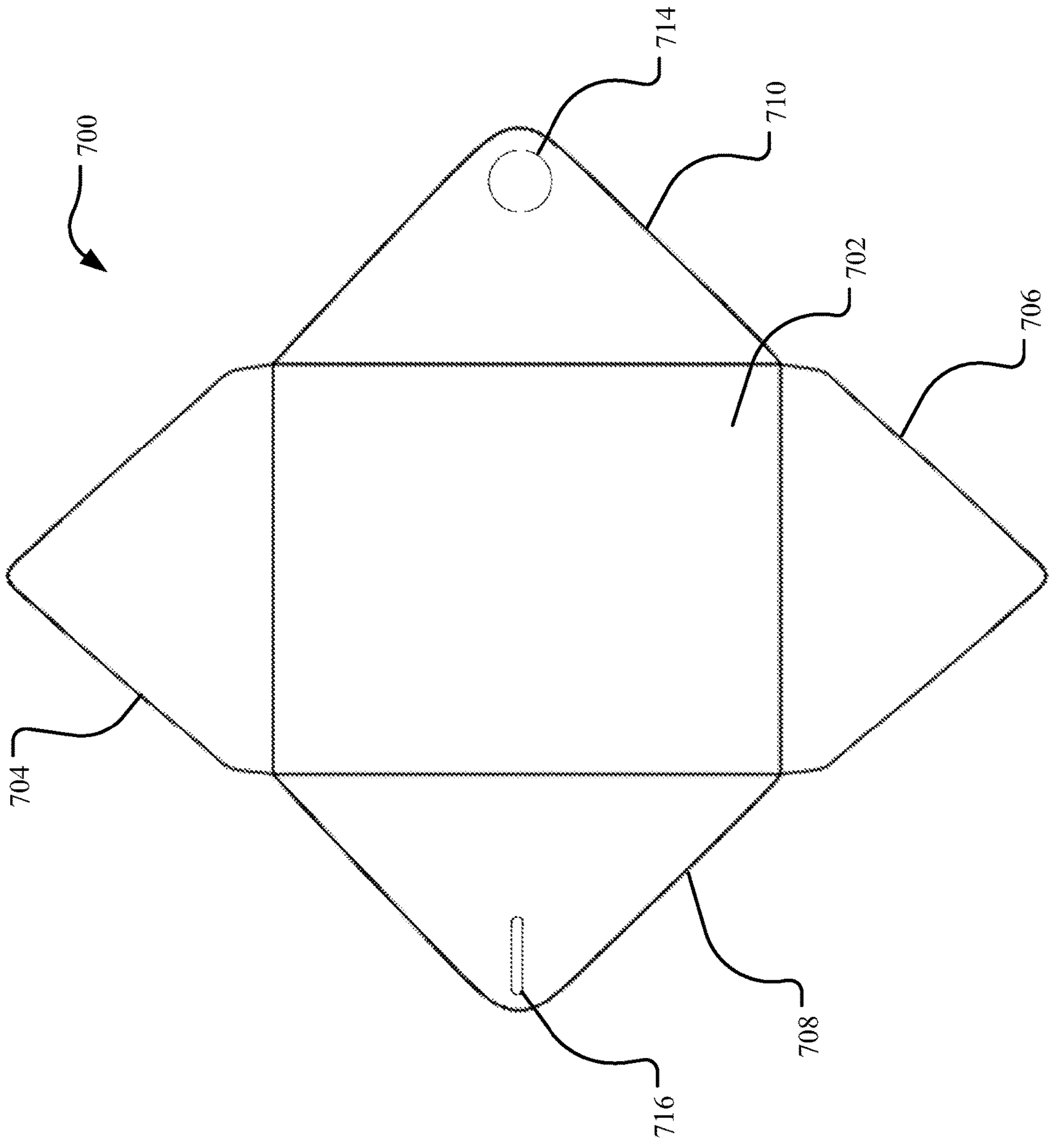
FIG. 19 illustrates the envelope in an open position.
Figure 20B:
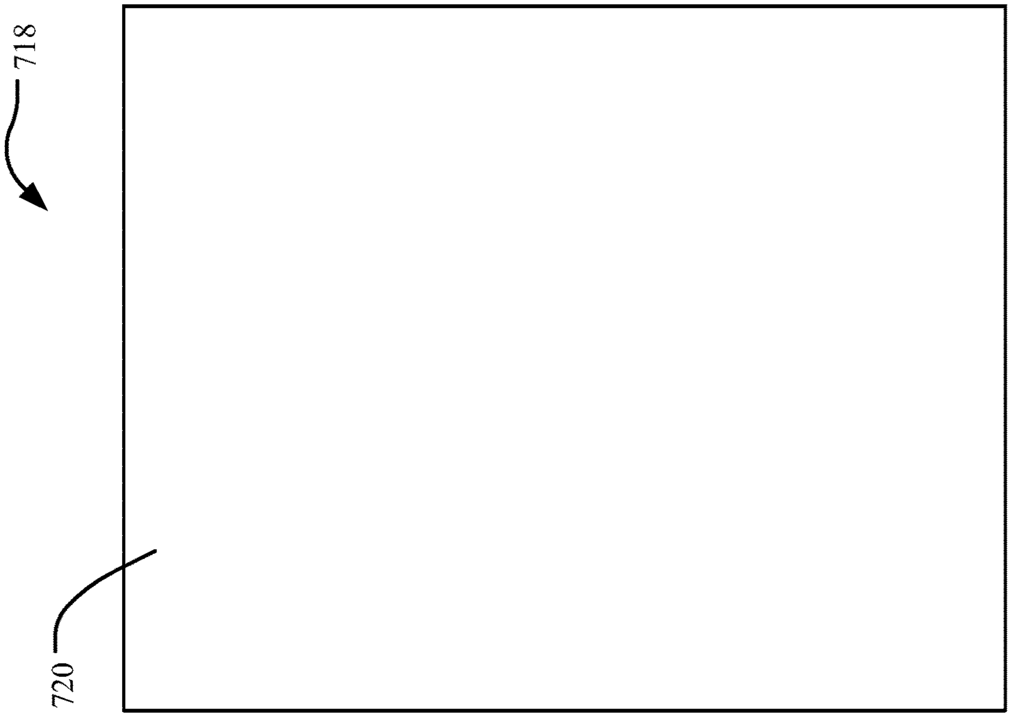
FIG. 20B shows a back view of the example display panel.
Figure 20A:
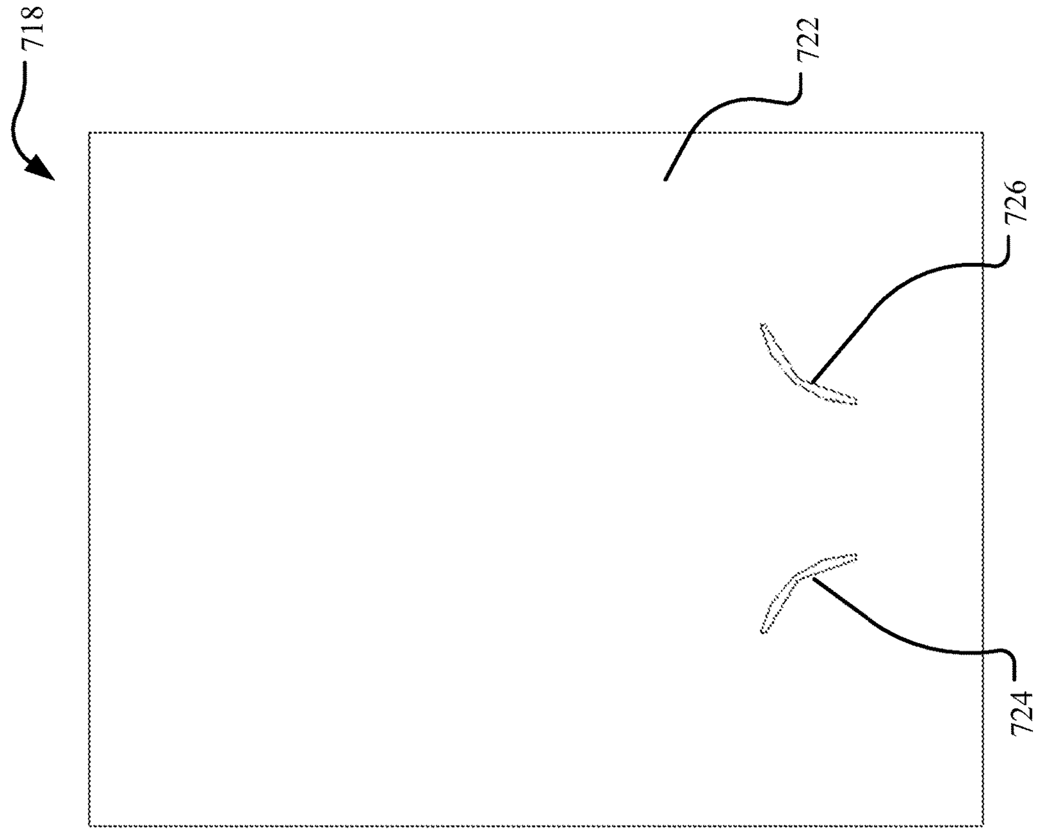
FIG. 20A depicts a front view of an example display panel.

As shown in FIGS. 13-14, which illustrate the imitation flower bouquet 100 in the unfolded position and the folded position, respectively, portions of the imitation flower bouquet 100 move in three planes relative to the axis 120, as the imitation flower bouquet 100 moves between the folded and unfolded position. A first plane 600 extends proximally and distally along a height of the imitation flower bouquet 100. A second plane 602 extends longitudinally along the imitation flower bouquet 100, and a third plane 604 extends transversely to the first and second planes 600-602. The fold lines 152 and 154 and the primary fold lines 312 and 338 may move along the second plane 602, and the connection lines and the mount panels 128 and 150 may move along the third plane 604. The imitation flower arrangement 106 moves along the second plane 602 and the third plane 604. The base panel 142 may be the only portion of the imitation flower arrangement 100 that moves along the first plane 600. In the unfolded position, the imitation flower bouquet occupies each of the planes 600-604, and in the folded position, the imitation flower bouquet 100 is flat in the first and second planes 600-602. FIG. 15 similarly illustrates the imitation flower arrangement 102 in the folded position within the first and second planes 600-602.

Referring to FIGS. 16A-20B, as described herein, the imitation flower bouquet 100 may be provided as part of an imitation flower bouquet system that may further include an envelope 700. In one implementation, the envelope 700 is configured to receive the imitation flower bouquet 100 in the folded position. In this manner, the imitation flower bouquet 100 may be mailed or otherwise easily transported or presented as a gift.

In one implementation, the envelope 700 includes a back panel 702, a proximal panel 704, a distal panel 706, a first side panel 708, and a second side panel 710. The imitation flower bouquet 100 may be positioned relative to the back panel 702 and the panels 704-710 folded together into a closed configuration to form an envelope interior enclosing the imitation flower bouquet 100 or other contents, such as a note, a card, and/or other objects in addition to or in place of the imitation flower bouquet 100. A lock 712 may hold the panels 704-710 in the closed configuration, thereby securing the contents inside the envelope 700.

In one implementation, the lock 712 includes a button 714 and a slit 716. The button 714 may include a set of slits separated from each other by a button mount. More particular, a first slit extends along a curve from a first end to second end, with a first fold line of the button mount linearly extending between the first end and the second end. Similarly, a second slit extends along a curve from a third end to fourth end, with a second fold line of the button mount linearly extending between the third end and the fourth end. The first fold line and the second fold line extend parallel to each other. The first end is disposed relative to the third end and the second end is disposed relative to the fourth end, such that the button mount is integral with a surface of the second side panel 710 and a first button portion and a second button portion is formed. The first button portion and the second button portion may be moved towards each other to fit into the slit 716. When released, the first button portion and the second button portion move away from each other to lock the first side panel 708 to the second side panel 710. The panels 704-706 may be folded towards each other prior to locking the panels 708-710 to each other, thereby securing the contents inside the interior of the envelope 700. To unlock the panels 708-710 from each other, the button portions may be moved toward each other for release through the slit 716.

A display panel 718 may be positioned inside the interior of the envelope 700 to display the imitation flower bouquet 100 in the folded position. The display panel 718 may be integrated with or loose from the back panel 702. In one implementation, the display panel 718 includes a back side 720 opposite a front side 722. The back side 720 may be positioned against the back panel 702. The front side 722 includes a first cutout 724 and a second cutout 726 to engage the imitation flower bouquet 100 in the folded position. In one implementation, the cutouts 724-726 receive opposite sides of the distal end of the imitation vase 104 in the folded position, such that the base panel 142 is positioned between the cutouts 724-726.

Figure 21:
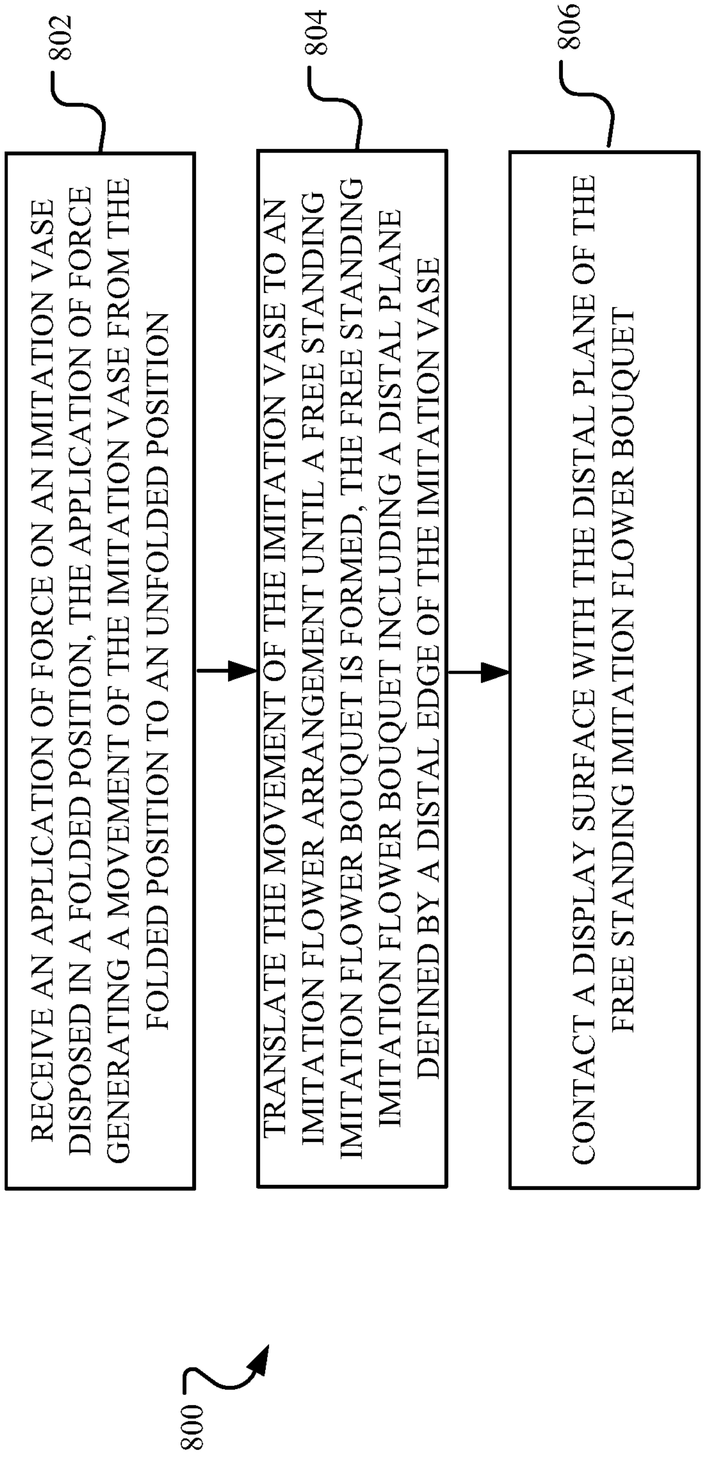
FIG. 21 illustrates example operations for imitation flower bouquet display.

Referring to FIG. 21, example operations 800 for imitation flower bouquet display are illustrated. In one implementation, an operation 802 receives an application of force on an imitation vase disposed in a folded position. The application of force generates a movement of the imitation vase from the folded position to an unfolded position. An operation 804 translates the movement of the imitation vase to an imitation flower arrangement until a free standing imitation flower bouquet is formed in the unfolded position. The movement may be translated using a translational relationship, for example created using a set of connections. The free standing imitation flower bouquet includes a distal plane defined by a distal edge of the imitation case. An operation 806 contacts a display surface with the distal plane of the free standing imitation flower bouquet. The free standing imitation flower bouquet may be maintained in the unfolded position using a base panel or under the weight of the free standing imitation flower bouquet. The free standing imitation flower bouquet may be moved from the unfolded position to the folded position through simultaneous movement of the imitation vase and the imitation flower arrangement.

In the present disclosure, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An imitation bouquet system, the system comprising:

a decorative portion including at least one decorative feature, the at least one decorative feature formed by a plurality of decorative panels intersecting each other along an axis; and an imitation vase including a plurality of panels, the decorative portion mounted to the imitation vase at a set of one or more connections in a translational relationship, the translational relationship creating a free-standing imitation bouquet moveable between a folded position and an unfolded position by translating movement between the decorative portion and the imitation vase such that when the free-standing imitation bouquet moves between the folded position and the unfolded position, the decorative portion folds or unfolds.

2. The imitation bouquet system of claim 1, wherein the at least one decorative feature includes at least one imitation flower, imitation leaf, imitation tree, imitation plant, character, imitation animal, or imitation object.

3. The imitation bouquet system of claim 1, wherein the decorative portion is mounted to the imitation vase using a base portion having one or more imitation stem panels.

4. The imitation bouquet system of claim 1, wherein the plurality of panels is formed by a plurality of planar surfaces.

5. The imitation bouquet system of claim 1, further comprising:

a base panel configured to lock the free-standing imitation bouquet in the unfolded position.

6. A method comprising:

presenting a free-standing imitation bouquet in a folded position, the free-standing imitation bouquet formed based on a translational relationship between a decorative portion and an imitation vase, the decorative portion including at least one decorative feature, the at least one decorative feature formed by a plurality of decorative panels intersecting each other along an axis, the imitation vase including at least one panel;

translating movement between the decorative portion and the imitation vase, such that when the free-standing imitation bouquet moves between the folded position and an unfolded position, the decorative portion folds or unfolds.

7. The method of claim 6, further comprising:

maintaining the free-standing imitation bouquet in the unfolded position.

8. The method of claim 7, wherein the free-standing imitation bouquet is maintained in the unfolded position using a base panel.

9. The method of claim 6, wherein the at least one decorative feature includes at least one imitation flower, imitation leaf, imitation tree, imitation plant, character, imitation animal, or imitation object.

10. The method of claim 6, wherein the decorative portion includes a base portion.

11. The method of claim 10, wherein the base portion includes one or more imitation stem panels.

12. The method of claim 6, wherein the free-standing imitation bouquet is presented in an envelope in the folded position.

13. An imitation bouquet system, the system comprising:

a decorative portion including at least one decorative feature, the at least one decorative feature formed by a plurality of decorative panels intersecting each other along an axis; and an imitation vase including at least one panel, the decorative portion mounted to the imitation vase in a translational relationship, the translational relationship creating a free-standing imitation bouquet moveable between a folded position and an unfolded position by translating movement between the decorative portion and the imitation vase such that when the free-standing imitation bouquet moves between the folded position and the unfolded position, the decorative portion folds or unfolds.

14. The imitation bouquet system of claim 13, wherein the at least one decorative feature includes at least one imitation flower, imitation leaf, imitation tree, imitation plant, character, imitation animal, or imitation object.

15. The imitation bouquet system of claim 13, wherein the decorative portion is mounted to the imitation vase using a base portion having one or more imitation stem panels.

16. The imitation bouquet system of claim 13, wherein the at least one panel is a planar surface.

17. The imitation bouquet system of claim 13, further comprising:

a base panel configured to lock the free-standing imitation bouquet in the unfolded position.

* * * * *